INVENTOR.
RICHARD E. MILFORD
BY
Warren F. B. Lindsley
ATTORNEY

READER
PUNCH
22b
READER CONTROL LOGIC
7 BIT SHIFT REGISTER
8 BIT REGISTER
PUNCH CONTROL LOGIC
51
26
28
29
20b
115
27
CLOCK AND BIT COUNTER
COMMUNICATION CONTROL LOGIC
B
21a
24e
24c
24b
24f
24d
24a
DATA SET
TELEPHONE FACILITY
21b
A
25
CENTRAL PROCESSOR
23a
20a
22a

COMMUNICATION CONTROL LOGIC

CLOCK GENERATOR

Feb. 25, 1969 R. E. MILFORD 3,430,204

DATA COMMUNICATION SYSTEM EMPLOYING AN ASYNCHRONOUS START-STOP CLOCK GENERATOR

Filed May 19, 1965 Sheet 6 of 18

TRANSMIT ZERO CODE

TRANSMIT SERIALIZER
FLIP-FLOP

Feb. 25, 1969 R. E. MILFORD 3,430,204

DATA COMMUNICATION SYSTEM EMPLOYING AN ASYNCHRONOUS START-STOP CLOCK GENERATOR

Filed May 19, 1965 Sheet 12 of 18

PUNCH CONTROL LOGIC

ERROR PUNCH LOGIC

United States Patent Office 3,430,204
Patented Feb. 25, 1969

3,430,204

DATA COMMUNICATION SYSTEM EMPLOYING AN ASYNCHRONOUS START-STOP CLOCK GENERATOR

Richard E. Milford, Phoenix, Ariz., assignor to General Electric Company, a corporation of New York Filed May 19, 1965, Ser. No. 457,018
U.S. Cl. 340—172.5 10 Claims
Int. Cl. G11b *13/00*; H04l *5/14*

ABSTRACT OF THE DISCLOSURE

A data communications system employing a clock generating means which starts and stops periodically in response to information signals, the period of time being short enough so that resynchronization is not necessary during the period of time it is operating.

TABLE OF CONTENTS

| | Column |
|---|---|
| General Description | 1 |
| Statement of the Invention | 1 |
| Brief Description of Drawings | 3 |
| Glossary and Index of Signals | 4 |
| Data Communication System Operation | 5 |
| Line Direction Control | 5 |
| Data Transmit Sequence | 6 |
| Data Receive Sequence | 6 |
| Transmission of 5, 6 and 7 Level Codes | 6 |
| Error Detection | 7 |
| Tape Operating Parameters | 7 |
| Block of Data | 7 |
| End-of-Data-Block Marker | 7 |
| Data Sets | 8 |
| Description | 8 |
| Attended Data Set Operation | 9 |
| Unattended Data Set Operation | 10 |
| Logic Components | 11 |
| Flip-Flop | 11 |
| AND-Gate | 11 |
| OR-Gate | 11 |
| Inverter | 12 |
| Communication Control Logic | 12 |
| Request to Send Data | 12 |
| Establishing Communication | 12 |
| Terminating Communication | 14 |
| Communication Interrupts | 14 |
| Clock Generator and Bit Counter | 14 |
| Shift Register | 18 |
| Description of Read Tape Mode of Operation | 20 |
| Set Tape Read Flip-Flop FTRD | 20 |
| Start Clock Generator | 20 |
| Transmission of First Code | 20 |
| Set Tape Leader Flip-Flop FTLD | 22 |
| Start Reader Search | 22 |
| End-of-Block Recognition | 23 |
| Read Termination Function | 24 |
| Retransmission of Data | 24 |
| Description of Punch Tape Mode of Operation | 25 |
| Receipt of First Zero Code | 25 |
| Receipt of Non-Zero Character | 26 |
| Error Circuitry | 28 |
| End-of-Block column 8 punch | 29 |
| Claims | 30 |

GENERAL DESCRIPTION

Statement of the invention

This invention relates to data communication systems and more particularly to systems for asynchronously generating groups of clock pulses.

Digital information has been transmitted from one location to another by means of electrical signals which have some characteristic such as frequency, duration or amplitude varied to indicate the information content. Where the digital information is in binary form, each individual digit or bit of digital information is allotted one of a number of recurring equal intervals, called bit intervals, during which the signal characteristics or changes therein signify the specific bit of digital information. The digital information may be derived by determining which of the signal characteristics are within each bit interval. Binary digital information is normally represented by varying a signal characteristic between first and second values or by varying the signal in a first or second sense.

Many codes are used for representing binary digital information. One binary code may indicate a digit value of one by the presence of a change of state during some portion of a bit interval and a digit value of zero by the absence of a change of state during a bit interval. Another binary code may represent a digit value of one by a first potential level during a bit interval and a digital value of zero by a second potential level during a bit interval.

It is possible with binary type codes to represent a great number of sequential bits of binary information without any change in the signal, i.e., a sequence of bits each having a zero digit value representing a constant potential level. Consequently, it is necessary for a system which is to receive binary digital information to have some means for determining the bit interval in order to derive the binary digital information from the transmitted signal. If the bit interval or its rate of recurrence which is termed the bit repetition rate is known, the number of binary digits which occur within any specified period is also known, but the instant during which a signal characteristic has information significance must be determined.

A data communication system which is adapted to receive digital information signals is equipped with circuitry for generating a train of pulses called clock or timing pulses at the bit repetition rate of the transmitted information signals and circuitry for utilizing the clock pulses to derive the digital information from the information signals. Synchronization must be achieved between the information signals and the clock or timing pulses and this must occur substantially instantaneously or a great deal of information may be lost before clock pulses become available at correct times to indicate the meaning of the information signals.

Many prior art systems include networks for deriving a control signal from the information signals for operating a clock pulse generator for producing clock pulses. However, these networks normally have fixed time constants which maintain the time required for synchronization constant even though the bit repetition rate varies or the repetition rate between sequentially received groups of information signals representing data characters varies. This is particularly true in data communication systems where the sequentially received characters are received asynchronously. If the data characters represented by information signals are received asynchronously, the prior art timing arrangement must be resynchronized periodically with an attendant loss of digital information each resynchronizing cycle.

Therefore, a need exists for a start stop generator for generating groups of clock pulses which last for a predetermined time, for example, the duration of one or more characters forming a character frame. A character frame usually comprises a start bit followed by a plurality of intelligence bits followed by two or more stop bits. As used herein a character frame consists of one start bit followed by 7 intelligence bits forming a character, 7 intelligence bits forming the inverse image of the character and two or more stop bits.

In order to provide positive synchronization between the information signals and the clock pulses without error it was determined that the clock generating means should start and stop periodically in response to information signals. The period of operation of the clock generator should be of a short duration so that resynchronization is not necessary during the period of time it is operating.

Therefore it is an object of this invention to provide an improved data communication system employing an asynchronously operable start-stop pulse generator.

Another object of this invention is to provide a system capable of synchronizing generator clock pulses with information signals in the shortest possible time.

A still further object of this invention is to provide a synchronous clock pulse generator system capable of responding to signals which may carry information in a number of different binary codes.

A still further object of this invention is to provide a synchronous clock pulse generator system which will generate clock pulses at an established repetition rate only during the time information signals are being received.

A still further object of this invention is to provide a system for initiating transmitting character cycles as soon as a character is available from an asynchronously operating reader structure.

Further objects and advantages of the present invention will become apparent to those skilled in the art as the description thereof proceeds.

Brief description of drawings

The present invention may be more readily described by reference to the accompanying drawings in which:

FIG. 17 is a diagrammatic illustration in chart form of the timing and logic signals involved in a tape reading operation;

FIG. 19 is a simplified block diagram of the punch control logic shown in FIG. 2;

GLOSSARY AND INDEX OF SIGNALS

Figure 1:
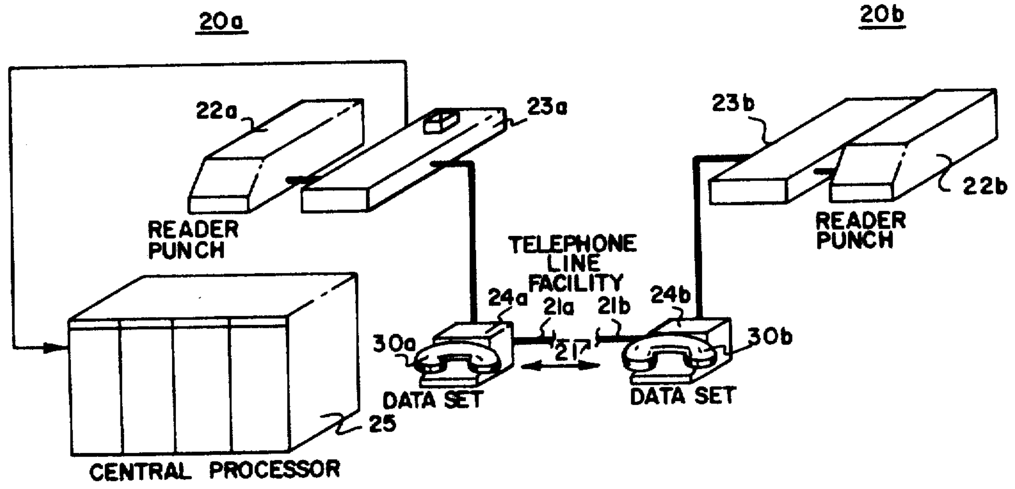
FIG. 1 is a simplified block diagram of an information processing system for transferring information from one location to another via common or private carrier wire lines, cables or cable carrier facilities and embodying the invention.

In order to more readily understand the disclosed invention, the signals provided by the various system circuit elements are tabulated below.

| Signals: | Description of signals |
|---|---|
| DC09 | Count 9 in bit counter. |
| DC16 | Count 16 in bit counter. |
| DC86 | Count 8 or 16 in bit counter. |
| DCOD | Carrier Off delayed ¼ second. |
| DCST | Clock generator start. |
| DCT1 | Count 1 in bit counter. |
| DDSC | Reader delayed search complete. |
| DDCR | Carrier On leading edge signal. |
| DENA | Enable input to punch register. |
| DEND | End punch tape mode. |
| DEOB | End-of-Block code. |
| DMRK | Receive Data-mark bit. |
| DOND | Carrier On delayed. |
| DPRO | Punch in Process. |
| DPUZ | Punch zero or blank tape. |
| DSET | Serial input to shift register. |
| DSPP | Start punch process. |
| DSRE | Reset pulse to shift register. |
| DSSR | Set Start Search flip-flop. |
| DTCP | Tape Read and Clear to Send pulse. |
| DTCX | Tape Read and Clear to Send signal. |
| DTZR | Tape Zero. |
| DXM0 | Retransmit. |
| DXMT | Transmit Data to data set. |
| DZE1 | Zero code from read amplifiers. |
| DZER | Zero code in shift register. |
| DZLC | Tape Zero and leader. |
| FC(00–03) | Bit counters 1 through 3. |
| FDPX | Half-Duplex Control flip-flop. |
| FERR | Error flip-flop. |
| FM08 | 8th Column Memory flip-flop. |
| FPUT | Punch Tape Mode flip-flop. |
| FPW8 | Puch Column 8 flip-flop. |
| FREV | Reader Reverse flip-flop. |
| FRSD | Request to Send flip-flop. |
| FSH(1–7) | Shift register stages 1 through 7. |
| FSHE | Shift Register Error flip-flop. |
| FSRH | Start Reader Search flip-flop. |
| FSTP | Start Punch Control flip-flop. |
| FTRD | Read Control flip-flop. |
| FW(01–08) | Puch Register flip-flops for columns 1 through 8. |
| FXME | Transmit Data Memory flip-flop. |
| FXMT | Transmit Serializer flip-flop. |
| JCTS | Clear to Send from data set. |
| JDSC | Search Complete from reader. |
| JDR1 | Data set Ring Line 1. |
| JDR2 | Data set Ring Line 2. |
| JDNT | Energize Interlock (off-line switch). |
| JMDA | Data set Receive Data. |
| JNPT | No paper tape signal from punch. |
| JOND | Carrier On signal from data set. |
| JPUP | Punch in Process. |
| JRS(1–8) | Reader signals for columns 1 through 8. |
| JREC | Reader eject complete. |
| KINT | Interlock relay. |
| KRIN | Ring relay. |
| QCQ1 | Ungated Clock Generator signal. |
| QCQ2 | Gated Clock Generator signal. |
| QCX1 | Start Clock Generator signal. |
| SCIN | Carrier Initiate signal from Request to Send switch. |
| TTS3 | Signal from multivibrator. |
| TTX3 | Pulse signal. |

DATA COMMUNICATION SYSTEM OPERATION

The present invention relates to data communication systems and particularly to terminal equipment for use at the ends of message networks or transmission links such as, for example, telephone lines for interconnecting computers and data accumulation equipment. Since it is believed to be unnecessary to describe the well-known details of these systems to completely describe the invention, block diagrams will be used where possible. However, even though known details will be eliminated, a basic description of the entire system will be presented to enable one skilled in the art to understand the environment in which the present invention is placed.

Accordingly, reference is made to FIG. 1 which shows diagrammatically a data communication system employing data processing facilities. As used herein, data communication means the transmission of information to and from data processing equipment. This includes assembly, sequencing, routing, and selection of such information as is generated at independent remote points of data origination. and the distribution of the processed information to remote output terminals or other data processing equipment. Various means of communicating from one point to another exist today as part of our nation's common and private carrier wire lines, cables, cable carriers, radio and microwave facilities.

Figure 2:
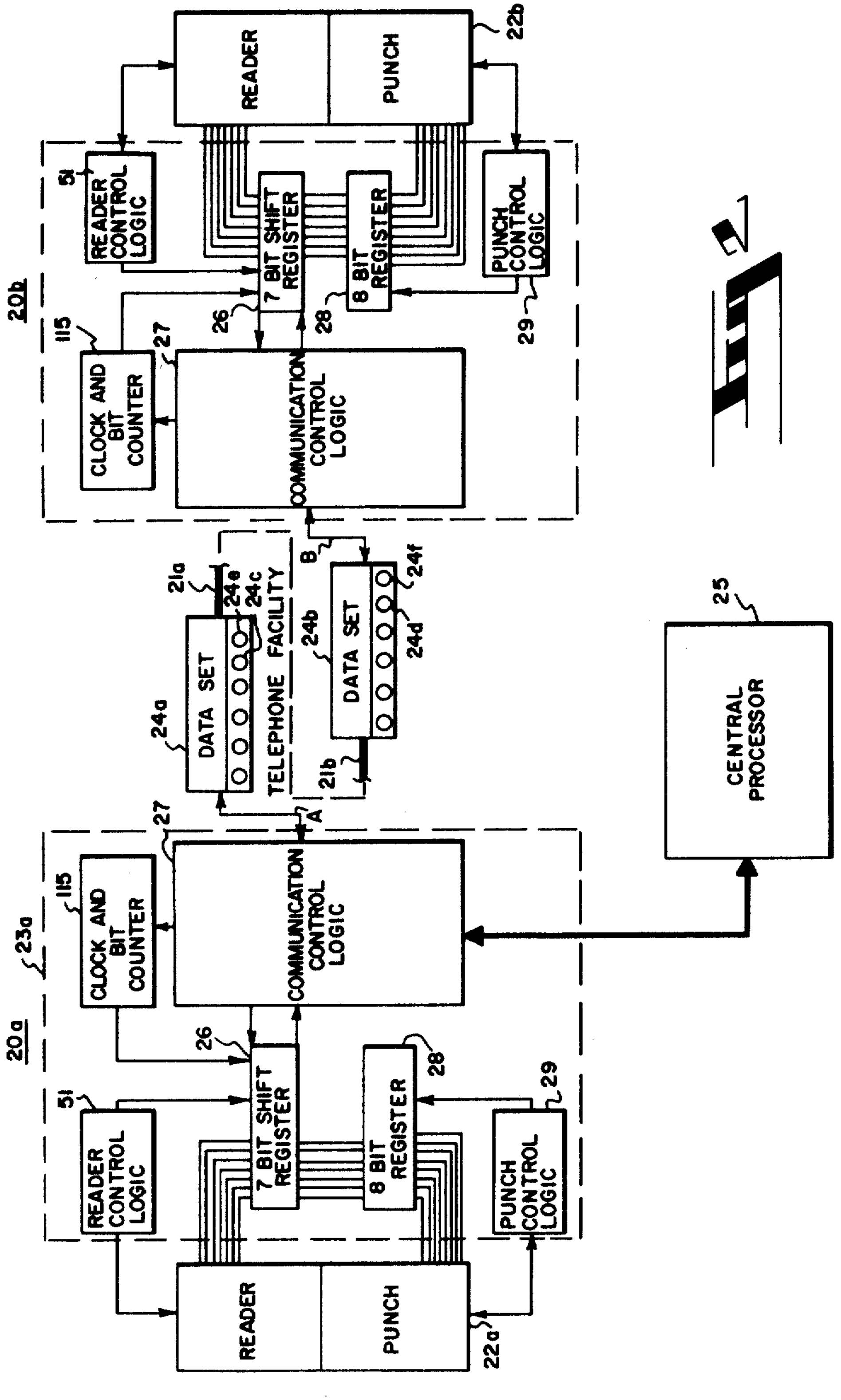
FIG. 2 is an expansion of the block diagram of FIG. 1 showing information flow in the system of the present invention.

In the communication system disclosed in FIGS. 1 and 2, a pair of remotely spaced data processing devices 20*a* and 20*b* are interconnected by a pair of transmission lines such as telephone conductors 21*a* and 21*b*. The data processing devices or business machines 20*a* and 20*b* comprise paper tape reader and punch structures 22*a* and 22*b*, controller units 23*a* and 23*b*, and digital data sets 24*a* and 24*b*, hereafter called data sets, connected together, as shown, through the telephone conductors 21*a* and 21*b*. If electronic data processing of the information received is desired, then either of the controller units 23*a* and 23*b* may be connected to a central processor. As shown in FIGS. 1 and 2, controller unit 23*a* is connected to central processor 25 for purpose of illustration.

Generally speaking, the structure disclosed is a paper tape terminal wherein the controller units 23*a* and 23*b* comprise control and synchronization circuitry, automatic error detection and correction features and serial/parallel data conversion. The reader/punch structures 22*a* and 22*b* provide input and output information to the controller units. The data sets 24*a* and 24*b* provide means for interconnecting the controller units and the paper tape reader and punch structure at each end of the transmission lines.

The data communication system disclosed operates by alternately sending and receiving data. The controller unit along with the data set of the terminal will automatically maintain half-duplex (line direction) control and will prohibit the transmission of data from one terminal to the other unless the line direction of the transmission line has been coordinated with the distant terminal. Thus, in a half-duplex transmisison system, data can be transmitted in only one direction at a time.

The controller units 23*a* and 23*b* each contain a parallel to serial converter. Data is received in parallel from the reader and transmitted bit serially (asynchronously) through the data set. Conversely, data is received serially from the distant terminal and transferred in parallel to the punch structure.

Line direction control

Line direction control is a function of the controller unit coordinating the data sets. The data set at the transmitting end of the line puts a tone on the line under control of its controller unit. This tone indicates to the receiving controller unit at the other end of the line that the line is in use. When the transmitting terminal reaches an End-of-Block code signal, the transmitting tone disappears. The cessation of the tone indicates to the receiving terminal that it is now possible to transmit data. The receiving controller unit initiates a change in line direction and becomes the transmitting terminal. Again transmission continues until an End-of-Block code signal has been received. The controller unit causes the data set to stop transmitting and the first terminal may again transmit. Thus, the line direction will be reversed after the completion of the transmission of a block of data in either direction. Failure of the receiving terminal to initiate a tone is detected by the transmitting controller unit. The absence of a return transmission tone within ¼ second is the indication of an error. The error condition causes the reader of the transmitting terminal to back up the paper tape over the block of data in which the error occurred and to retransmit the same block of data again. In the event that a terminal has nothing to transmit, a tone is still initiated for a short period of time as an indication that the last block of data had no errors. This allows the terminal with data to transmit, to start reading and transmitting the next block of data.

Data transmit sequence

Figure 12:
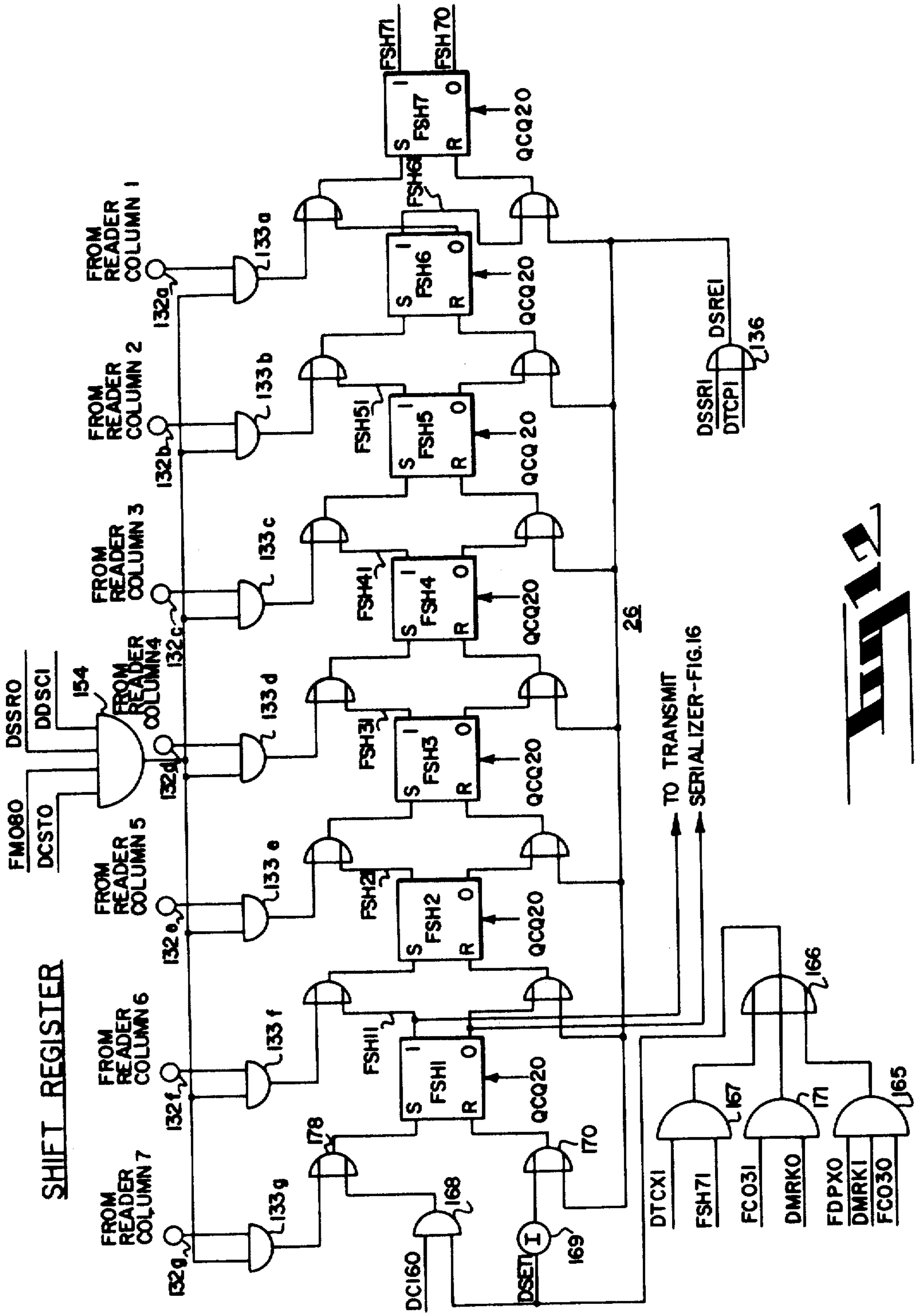
FIG. 12 is a schematic block diagram of a shift register.

After the line direction has been established to transmit data from one of the terminals, each character is sequentially read by the reader at that terminal and transferred in parallel bits to its 7 bit shift register 26 (shown in FIGS. 2 and 12). From here the bits of the character are shifted out through the communication control logic shown in block 27 to the terminal's data set. As used herein, a character is a sequence of binary digits (bits) used to represent the decimal digits 0 through 9, the letters A through Z, punctuation marks, operation symbols, and any other single symbols which a computer may read, store or write. The data set changes the code of the character into tones for transmittal along the transmission line to a data set at another terminal. Transmission of the data characters is asynchronous, and the start and stop bits of the characters, shown in FIGS. 3 and 4, and transmitted along the transmision lines are supplied by the communication control logic of the transmitting terminal.

Data receive sequence

The data receive sequence is basically the reverse of the data transmit sequence. Incoming data is changed by the receiving data set into a digital form acceptable to the communication control logic 27. The bits of the character are stored in the shift register 26 of the receiving terminal until a complete character has been received. Then the character is shifted out, in parallel, to a punch register 28 of the receiving terminal, where the punch control logic 29 (shown in FIG. 2) controls the character until it is punched. The data receiving action continues until the transmitting terminal reaches an End-of-Block code signal.

Transmission of 5, 6 and 7 level codes

Figure 3:
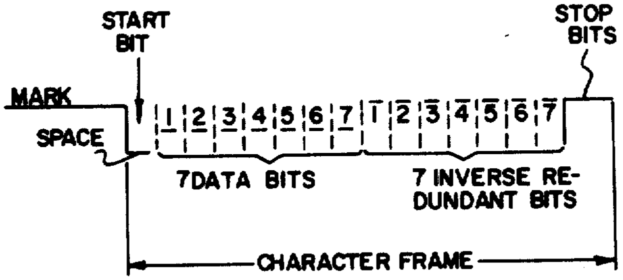
FIG. 3 is a diagrammatic illustration of a 7 bit character frame.

The disclosed data communication system transmits 14 intelligence bits in a sequence called a character frame. Each character frame transmitted consists of one start bit, 7 intelligence bits transmitted twice, and two or more stop bits. The character frame for a transmitted 7 level code is shown in FIG. 3.

Figure 4:
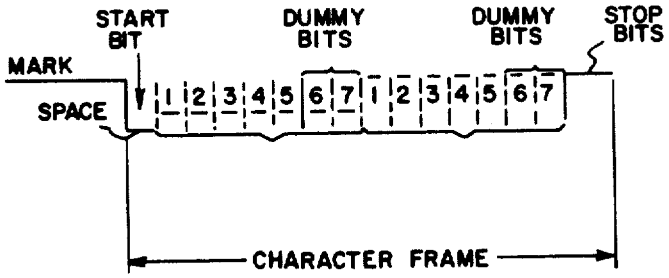
FIG. 4 is a diagrammatic illustration of a 5 bit character frame.

The transmission of the 5 and 6 level codes is accomplished in a similar manner by inserting in the character frame the proper number of bits in the character bit sequence. In order to have 14 bits, it is necessary that the controller unit insert dummy bits into the sequence of bits which dummy bits are ignored by the receiving terminal. The character frame for the transmission of the 5 level code is shown in FIG. 4.

Although the disclosed data communication system is shown as handling 5, 6 and 7 level codes, it can be modified to handle an 8 level code. Since the scope of this invention is not directed to the transmittal on receipt of any given character or code, this feature will not be described in detail.

Error detection

Error detection is accomplished by a bit-by-bit comparison of the sequence of bits forming the character by the controller units 23*a* and 23*b*. As shown in FIGS. 3 and 4, the inverse of each character forms the latter part of each character frame and is automatically generated by the communication control logic of each terminal and transmitted to the receiving terminal with each character. This form of redundant transmsision makes it possible to compare the second half of the transmission of each character frame against what was received during the transmission of the first half of the character frame. A mis-comparison is an error condition. When the controller unit detects an error, the punch operation is inhibited and blank spaces (sprocket holes only) appears on the receiving terminal's tape for the remainder of the block of data. At the end of the erroneous block of data, the transmission is not acknowledged. The transmitting terminal then backs up on block of data and transmits the same block of data again. This sequence continues until the block of data has been received correctly, or until the operator intervenes to halt the transmission.

TAPE OPERATING PARAMETERS

Block of data

A paper tape generated for transmission by the disclosed terminal structure should employ blocks of data wherein each data block is followed by an End-of-Data-Block marker. The tape should be so marked that a block of data will define the data between End-of-Block markers on the tape. There is no restriction by the disclosed structure on the length of the blocks of data used.

End-of-data-block marker

A block marker is an End-of-Block code signal inserted on the tape at regular intervals to define data block lengths. The beginning of a block of data starts with any data character after the receipt of a space or End-of-Block code signal from the previous block of data. Block markers determine the timing for reversing the direction of movement of the data along the transmission line and causes automatic retransmission of the data when an error is detected. A block marker may also serve the following functions, namely:

(1) Stops transmission of the data by the sending terminal and causes it to wait for an answer from the receiving terminal. If no answer is received, the tape is backed up to the preceding block marker and the data is retransmitted. When a block of data is received by the receiving terminal without error, the receiving terminal answers the sending terminal by transmitting a tone with or without data, signifying no error in received data.

(2) Controls the length of the block of data. A short block length means that when an error is detected, less time is needed to back up and retransmit the same block of data again. The transmitting terminal does not know an error has occurred until the end of the block of data it is transmitting.

(3) Inhibits transmission of one or more blank spaces (sprocket hole only) in the transmitting terminal's tape such as tape leader. When this condition occurs following data, an End-of-Block code signal is transmitted to the receiving terminal and is punched as an 8-column hole.

Figure 5:
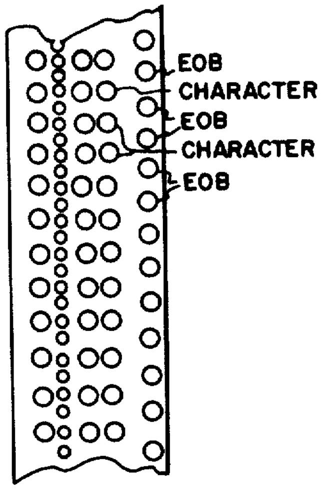
FIG. 5 is a fragment view of an operating tape containing a repetition of one character followed by an End-of-Block code signal.

In order to identify a calling terminal by an unattended receiving terminal, an "operate tape" is mounted in the reader of the calling terminal. This operate tape contains a repetition of one character (any character) followed by an End-of-Block code signal. The unattended receiving terminal requires that a legitimate character be received before the unattended terminal will commence transmission. This provides protection at the unattended terminal against an accidental wrong number voice call causing the terminal to transmit. FIGURE 5 illustrates a piece of tape illustrating the coding described above on the operate tape.

DATA SETS

Description

The data sets 24*a* and 24*b* are transmit and receive telephones compatible in operation and provided with remote control features for transferring between talk and data modes of operation. These phones which are well known in the art are capable of providing unattended answer service. They are designed to accept binary DC data pulses at the rate of 150 to 1200 bits per second for message network transmission, or up to 1800 bits per second for specially equalized and conditioned private line circuits. These pulses are converted into FM signals suitable for transmission over voice band telephone facilities. The data sets have the capability of receiving and restoring these FM signals to their original DC form for delivery to the associated business machine structures.

The terminal structures disclosed operate in half-duplex fashion. By controlling the direction of the carrier wave on the telephone lines, terminals 20*a* and 20*b* may take turns in transmitting and receiving blocks of information. For example, terminal A of FIG. 2 will send a block of data to terminal B. Terminal B will check the received data for errors and if the block of data is correctly received, terminal B will acknowledge receipt by reversal of carrier direction. Terminal B may then send a block of data to terminal A.

The data sets shown in FIGS, 1, 2 and 6 each comprises a telephone set illustrated as 24*a* or 24*b* in FIGS. 1 and 2, an FM modulator 31, demodulator 32 and control circuits 33. Each data set is provided with a plurality of terminal leads 34 through 45 for connecting the data set to the business machines 20*a* and 20*b*. Although only one data set and business machine structure at one end of the transmission line is described, it is intended that this description be applied to the data set and business machine structure at the other end of the telecommunication line since they are substantially identical in parts and function.

Figure 8:
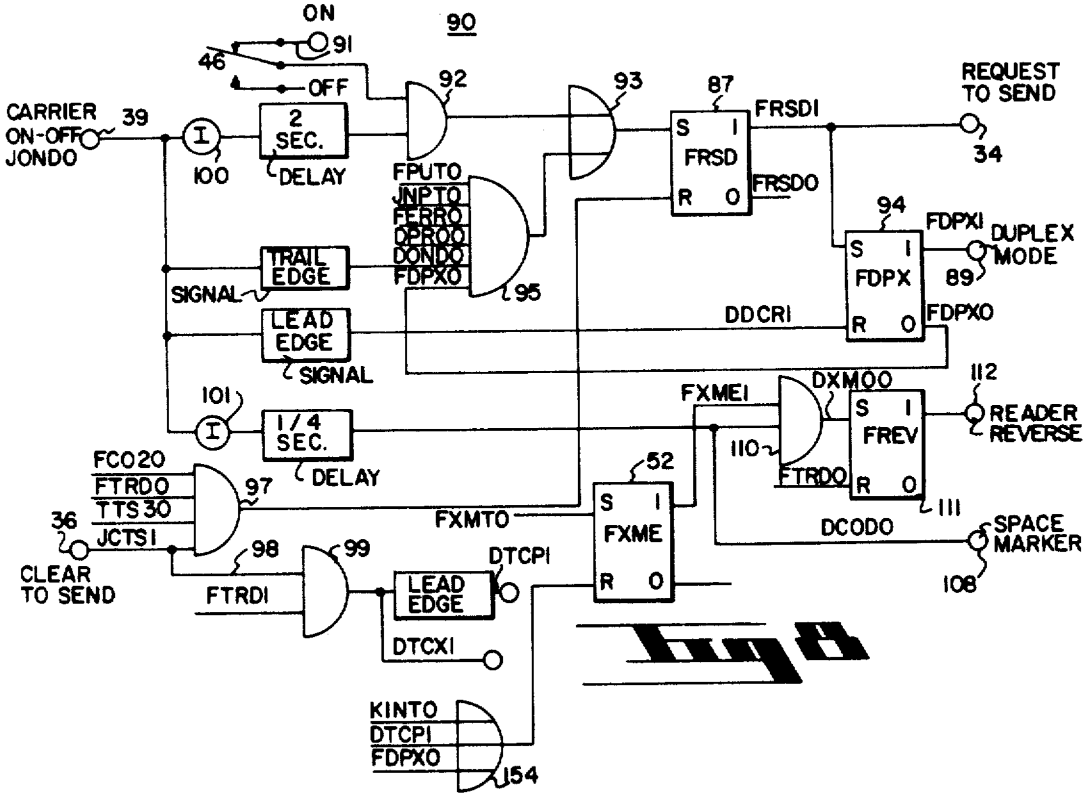
FIG. 8 is a schematic block diagram of the communication control logic shown in FIG. 2.

The Request to Send terminal lead 34 is connected to the 1-output terminal of Request to Send flip-flop 87 shown in the communication control logic of FIG. 8. A plus 6 volts is applied to this terminal lead when flip-flop 87 is set and a minus 6 volts when flip-flop 87 is reset.

Figure 16:
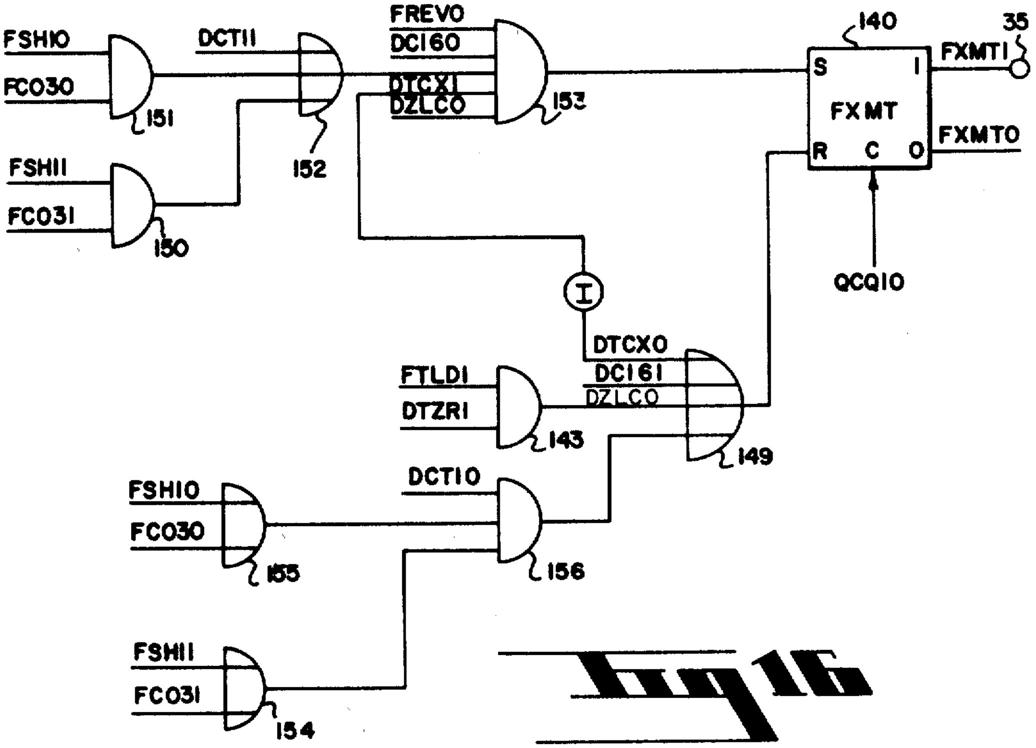
FIG. 16 is a simplified block diagram of the Transmit Serializer flip-flop logic.
Figure 11:
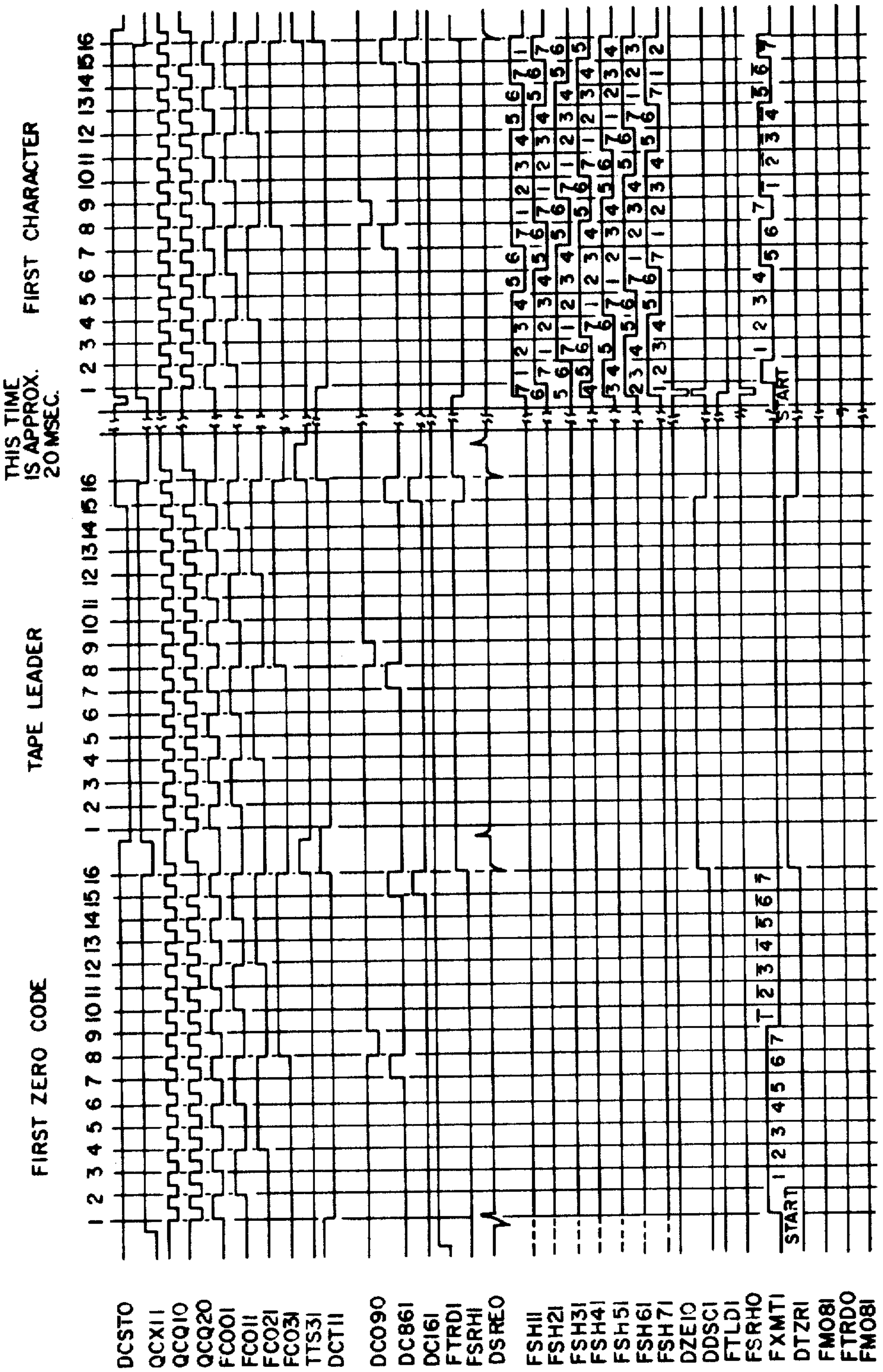

The Send Data terminal lead 35 is connected to the 1-output terminal of Transmit Serializer flip-flop 140, shown in FIG. 16. When flip-flop 140 is set, a "space" signal of approximately a plus 6 volts is applied to the modulator of the associated data set. When flip-flop 140 is reset, a "mark" signal of approximately a minus 6 volts is applied to the associated data set. The minus 6 volts or mark signal energizes modulator 31 of the data set and causes the modulator to provide a 1200 cycle per second carrier wave to the transmission lines 21*a* and 21*b*. A space or positive 6 volts signal changes the frequency of the carrier wave generated by modulator 31 to 2200 cycles per second.

The Clear to Send terminal lead 36 is connected to AND-gate 97 of the communication control logic shown in FIG. 8 of the associated business machine to transmit to it a signal generated by the business machine of a distant terminal approximately 200 milliseconds after it receives a Request to Send signal. This delay is necessary to insure that the control circuitry of the data sets at both terminals are properly conditioned for operation. The Clear to Send signals are approximately a plus 8 volts in the circuitry disclosed.

The Signal Ground terminal lead 37 is connected to the ground of the associated business machine and thus provides a ground reference for the terminal.

The Receive Data terminal lead 38 connected to the demodulator 32 of the data set converts the received carrier signals to mark and space logic level signal JMDA1.

When a mark signal is received by demodulator 32, a minus 8 volt signal is supplied to the associated business machine through terminal lead 38 and when a space signal is received, a plus 8 volt signal is supplied to the associated business machine.

The Carrier On-Off terminal lead 39 is connected to the communication control logic shown in FIG. 8. When a carrier signal is present on the transmission line 21, the demodulator 32 connected thereto generates an output logic level signal of a plus 8 volts for application to terminal lead 39. If the carrier signal disappears, a logic level signal of a minus 8 volts is applied to terminal lead 39.

The Interlock terminal lead 40 furnishes to the associated business machine a plus 8 volts signal JDNT1 when the data set is in the receive data mode. When not in the receive data mode, this terminal lead provides a signal at ground potential.

The Remote Control terminal lead 41 is provided for furnishing a signal in conjunction with the Ready and Remote Release signals of the data set to the associated business machine to energize the control logic of the associated business machine causing it to operate when the data set is in the automatic answering mode. The Ready signal applied to terminal lead 42 by the business machine provides for automatic answering by the data set, and the Remote Release signal applied to terminal lead 43 permits the control circuitry of the business machine to terminate a call by opening the circuit established between the Remote Release and Remote Control lines 43 and 41, respectively. If these terminal leads are not connected together within the business machine control logic, the data set will not lock in the data mode. In the control logic of the business machines 20*a* and 20*b*, these leads are connected together as long as an off-line switch (not shown) is in its normal on-line position.

The Ring Indicator terminal leads 44 and 45 are used when the data sets are operating in the unattended mode. These lines are connected together during each ringing cycle and are used to energize a ringing relay shown in FIG. 7. Terminal lines 44 and 45 are open and not in use when the data sets are in any mode other than the unattended or automatic answering mode.

Attended data set operation

In normal attended use during business hours, the data sets may be left in their "talk" modes and may be used as regular business phones. If one of the business machines 20*a* and 20*b* has a message for the other, the operator makes initial contact through voice communication. By common agreement, one terminal will initiate carrier signal by switching the Request to Send switch 46 shown in FIG. 8 to its ON position. Both operators check the amount of tape in the reader and the punch and then close their data switches 24*c* and 24*d* on their respective data sets providing half-duplex data communication between the two business machines 20*a* and 20*b*. The telephone sets 30*a* and 30*b* of these data sets may then be replaced in their cradles.

When the data switches 24*c* and 24*d* on the data sets are depressed and closed, the voltage level on the Interlock terminal lead 40 changes from a ground potential to a positive 6 volts. This causes coil 47 of an interlock relay 48 called KINT, shown in FIG. 7, to be energized. Before relay 48 is energized, the signal KINT0 at terminal 49 is a plus 6 volts which holds Error flip-flop 50, shown in FIG. 20, and Reader Control Mode flip-flop 51, shown in FIG. 13 in their reset states. As soon as contacts 55 and 56 of relay 48 close, signal KINT1 at terminal 57 becomes a plus 6 volts and resets the Punch Tape Mode flip-flop 60 shown in FIG. 19. Energization of relay 48 also closes contacts 60 and 61 causing a negative 24 volts to be applied to the coil 62 of the power relay 63 called KPWR. Energization of coil 62 of relay 63 causes the closing of contacts 65, 66, 67, 68 and 69, 70 and electric power is applied through these contacts to the reader and punch structures 22*a* and 22*b*. The closing of contacts 65 and 66 provides a Ready signal to terminal lead 41 of the data sets.

Figure 7:
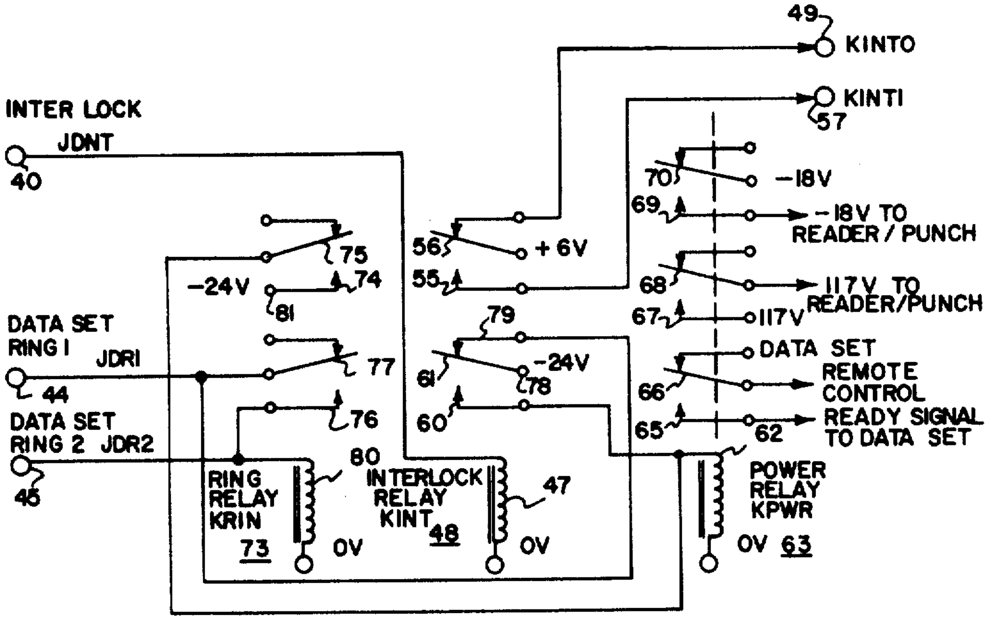
FIG. 7 is a schematic illustration of the relay latching arrangement of the data set shown in FIG. 6.

As soon as the interlock circuit, shown in FIG. 7, is energized, the business machines 20*a* and 20*b* operate on-line, i.e., in communication with each other through the telephone lines 21*a* and 21*b* until the data switches 24*c* and 24*d* are opened at which time the interlock and power relays 48 and 63 will be de-energized.

Unattended data set operation

The terminal structures A and B are each capable of unattended operation. In response to a call when in the unattended mode (automatic answering), the motor of the reader/punch structure of the called terminal is turned on, electronics in its control logic are reset, and the call answered by a tone of short time duration generated by the called data set. The unattended terminal automatically shifts to its data communication mode. When the calling operator hears the short answering tone from the called terminal, he presses the data button on his data set which signals the start of the operation.

The unattended terminal will not punch or read data due to a voice talking on the line, as might happen in case of a wrong number. This is accomplished through the requirement that the unattended station must receive a good block of data comprising at least one character from the calling terminal before it will cause transmission to start. An operate tape, as shown in FIG. 5, may be used by the calling terminal to activate the unattended terminal.

In the unattended answering or automatic mode of the data sets 24*a* or 25*b* instigated by the depressing of their buttons 24*e* or 24*f* shown in FIG. 2, calls from the other data sets can be answered automatically. With one data set in the automatic mode, it may then receive a call from the other set. The called data set will signal the business machine associated with it that its telephone set is ringing by closing the circuit between the Ring Indicator leads 44 and 45 each ring cycle. This action continues until the business machine being called generates a signal to answer the call or by the calling data set terminating the call.

As explained above, the ringing signal applied to the data set circuitry at the called terminal causes Ring Indicator terminal leads 44 and 45 to be connected together for the duration of the ringing cycle. A negative 24 volts applied to terminal 78, as shown in FIG. 7, causes a current to flow through the normally closed contacts 61 and 79 of the interlock relay 48, Ring Indicator terminal leads 44 and 45, and coil 80 of ring relay 73 to ground. Once coil 80 of relay 73 is energized and contacts 76 and 77 have been closed, these contacts will keep ring relay 73 energized as long as a minus 24 volts is available at terminal 78 to energize the coil.

The energization of coil 80 causes the closing of contacts 74 and 75 of ring relay 73. Current then flows from a minus 24 voltage source connected to terminal 81 through contacts 74, 75 and coil 62 of power relay 63 to ground. The energization of power relay 63 causes the closing of contacts 67, 68, 69, 70 and the supplying of electrical energy to the power supplies of the reader/punch structures 22*a* and 22*b*. In addition, the energization of the power relay 63 closes contacts 65 and 66 to complete a circuit between Remote Control and Ready terminal lines 42 and 43 to enable the data set to complete the automatic answering procedure.

When the call has been established, an Interlock signal JDNT at terminal lead 40 of FIG. 7 will be generated by the called data set and applied to coil 47 of interlock relay 48 Energization of relay 48 causes the separation of its contacts 61, 79 and de-energization of ring relay 73. Power relay 63 remains energized by current flow from the voltage source connected to terminal 78, through contacts 60 and 61 of interlock relay 48, and coil 62 of power relay 63 to ground. Energization of interlock relay 48 causes contacts 55 and 56 to close, thereby providing a plus 6 volts signal to terminal 57 of FIG. 7. The function of signals KINT0 and KINT1 is to reset the control electronics in terminals 20*a* and 20*b* and maintain it reset until the data mode is established.

Once established, a cell cannot be terminated by the unattended station unless a power failure occurs. Normally, the calling terminal terminates the call by releasing the data switch 24*c*, returning to the talk mode, or hanging up by placing the receiver or telephone set in its cradle.

LOGIC COMPONENTS

Flip-flop

The flip-flop or bistable multivibrators referred to in the specification, and shown, for example, in FIG. 8 of the drawings, are circuits adapted to operate in either one of the two stable states and to transfer from the state in which they are operating to the other stable state upon the application of a trigger signal thereto. In one state of operation, the flip-flop represents the binary 1 (1-state) and in the other state, the binary 0 (0-state). The two leads entering the left-hand side of the flip-flop symbols 87 and 94, shown in FIG. 8, provide the two required trigger signals. The upper input leads, the set input leads, provide the set signals and the lower input leads, the reset input leads, provide the reset input signals. When the set input signals go positive, the flip-flops are transferred to their 1-states, if they are not already in the 1-state. When the reset input signals go positive, the flip-flops are tarnsferred to their 0-states, if they are not already in their 0-states. The two leads leaving the right-hand sides of the flip-flop symbols deliver the two output signals for each flip-flop. The upper output leads, the 1-output leads, deliver the 1-output signals of the flip-flops and the lower output leads, the 0-output leads, deliver the 0-output signals.

In the description and drawings, each of the flip-flops disclosed has been further identified by a four letter designation such as, for example, FRSD for flip-flop 87. The output signals for this flip-flop as well as the other flip-flops used are identified by four letters corresponding to the identification of the particular flip-flop with a numeral 1 or 0 added after the four letter designation to identify the logic polarity of the outputs. For example, the output signal from the 1-output terminal of the Request to Send flip-flop 87 is FRSD1 and by convention is positive when the true sense of its name is met and negative when false. The output signal from the 0-output terminal of flip-flop 87 is FRSD0 and is negative when the true sense of the flip-flop's name is met. Signals from various other components used are provided with other letters and numeral designations. The chart preceding the description of the specification identifies the terms used.

AND-gate

The AND-gates disclosed in the drawings and particularly in FIG. 8 provide the logical operation of conjunction of binary 1 signals applied thereto. In the system disclosed, since the binary 1 is represented by a positive signal, the AND-gate provides a positive output signal representing a binary 1 when, and only when, all of the input signals applied thereto are positive and represent binary 1's. The symbol identified by the numerals 92 and 99, inter alia, in FIG. 8, represent two input AND-gates. Such AND-gates deliver a binary 1 output signal only when each of the two input signals applied thereto represent a binary 1. A six input AND-gate, such as represented by AND-gate 95, later described, delivers a binary 1 output only when each of the six input signals represent a binary 1.

OR-gate

The OR-gate 93 disclosed in FIG. 8 provides the logical operation of inclusive-OR for binary 1 input signals applied thereto. In the system, since the binary 1 is represented by a positive signal, the OR-gate provides a positive output signal representing a binary 1 when any one or more of the input signals applied thereto are positive and represent binary 1's. The symbol identified by gate 93 in FIG. 8 represents a two input OR-gate. This OR-gate delivers a binary 1 output signal when any one or both of its input signals applied thereto represent binary 1's.

Inverter

The inverters disclosed in FIG. 8 and represented by numerals 100 and 101 provide the logical operation of inversion for an input signal applied thereto. The inverter provides a positive output signal representing a binary 1 when the input signal applied thereto is negative, representing a binary 0. Conversely, the inverter provide an output signal representing a binary 0 when the input signal represents a binary 1.

COMMUNICATION CONTROL LOGIC

Operation of the business machines 20*a* and 20*b* is initiated by closing the Request to Send switch 46 in the communication control logic 27 of terminals A or B. When an operator, for example, decides to send data from terminal B to unattended terminal A, a signal from conductor 91, shown in FIG. 8, is transmitted through the Request to Send switch 46 to an input terminal of AND-gate 92. The conditions for conjunction in AND-gate 92 are now satisfied, since AND-gate 92 is normally enabled by a signal JOND0 appearing at its other input terminal representing the absence of a carrier wave on the transmission line. The output signal from AND-gate 92 is applied to an input terminal of OR-gate 93, and the output signal from OR-gate 93 is applied to the set input terminal of a Request to Send flip-flop 87. When the Request to Send flip-flop 87 is in its 1-state, a signal from its 1-output terminal, identified as FRSD1, is applied through terminal lead 34 to modulator 31 of data set 24*b*. Modulator 31 is actuated to supply a carrier wave to the telecommunication lines 21*a* and 21*b*.

Request to Send data

The Request to Send signal FRSD1 received from the 1-output terminal of flip-flop 87 is also applied to the set input terminal of a Duplex Mode flip-flop 94. Signal FRSD1 sets flip-flop 94 to its 1-state causing flip-flop 94 to generate a signal identified as FDPX1 at its 1-output terminal 89 remembering that data set 24*b* at terminal B was last conditioned to send data to another terminal such as terminal A. The 0-output terminal of flip-flop 94 is connected to one of the input terminals of AND-gate 95. The output terminal of AND-gate 95 is connected to the other input terminal of OR-gate 93.

Once the Request to Send signal to data set 24*b* actuates modulator 31, and initiates a carrier wave for application to the transmission line, the Request to Send switch 46 at terminal B has no further effect on flip-flop 87. If for any reason the carrier wave initiated from either of the terminals A or B should drop out for a period exceeding two seconds, flip-flop 87 at the calling station will again be set automatically and a carrier wave will again be initiated by modulator 31 of the calling terminal B.

Establishing communication

Assume for purposes of illustration that business machine 20*b* at terminal B has a punch paper tape loaded into its reader and wishes to transmit a block of information to the remote terminal A located at the other end of the transmission line. Assume also that terminal B has its Request to Send switch 46 closed. The Request to Send signal FRSD1 applied to terminal lead 34 by terminal B causes data set 24*b* to transmit a carrier wave to the transmission line 21*b*. At remote terminal A, the leading edge of the first waveform of the carrier wave is applied through Carrier On-Off terminal 39 to the reset terminal of the Duplex Mode flip-flop 94 to reset it.

Approximately 200 milliseconds after carrier signal from terminal B is sent to data set 24a at terminal A, a Clear to Send signal JCTS1 is generated by data set 24b. This Clear to Send signal JCTS1 is applied to one of the input terminals of AND-gates 97 and 99 in the communication logic of the calling terminal B shown in FIG. 8.

Figure 13:
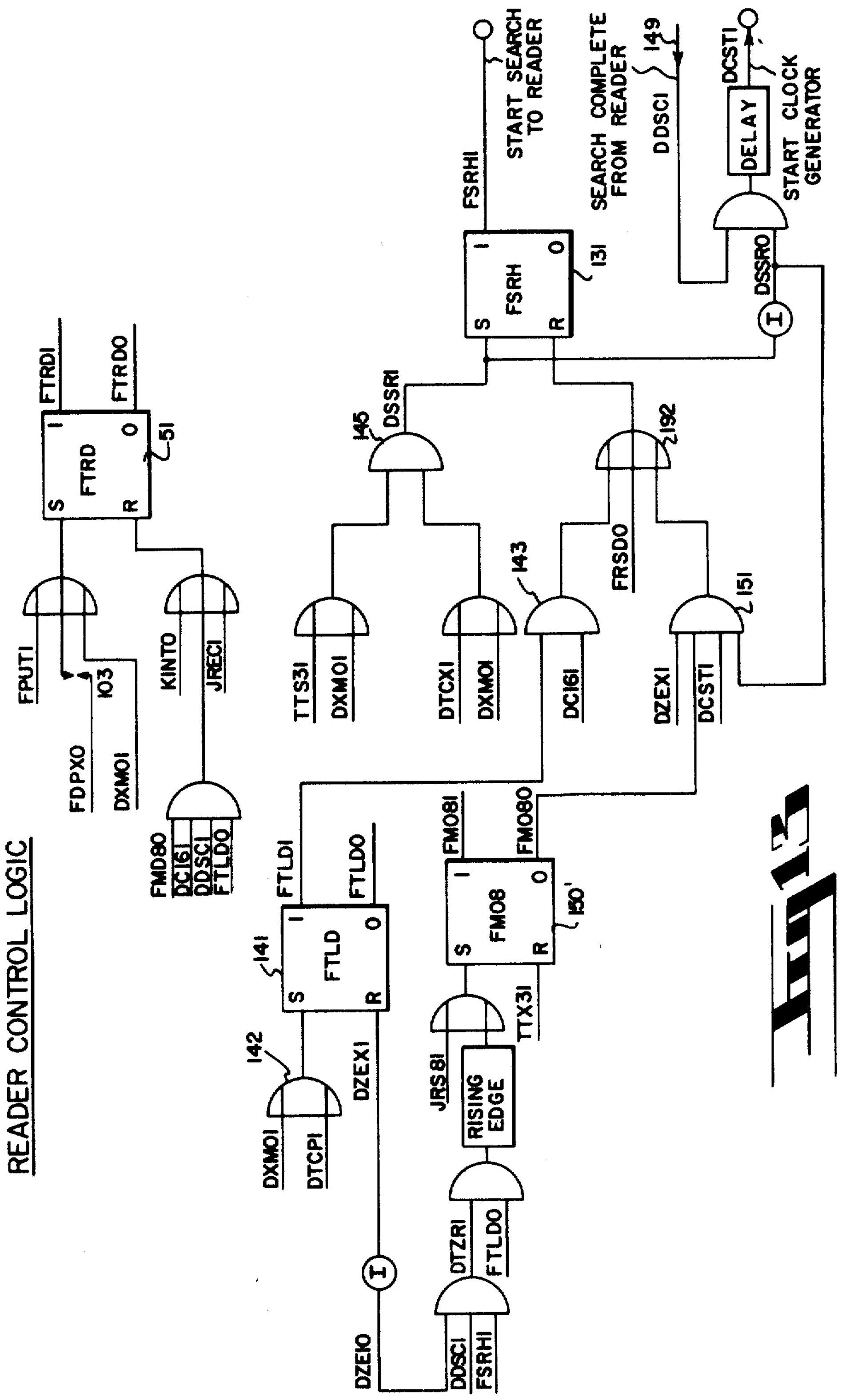
FIG. 13 is a simplified block diagram of the reader control logic shown in FIG. 2.

At this time, when contact is first being established between the terminals at the two ends of the telecommunication lines 21a and 21b, Reader Control Mode flip-flop 51 called FTRD in the reader control logic of the calling terminal B, shown in FIG. 13, is not yet set. It should be recognized that, in the static state with tape in the reader at the read station, all flip-flops in the reader control logic are in their reset states. Flip-flop 87, shown in FIG. 8, is reset by the output signal from AND-gate 97 and data set 24b is placed in the receive condition.

AND-gate 97 provides an output signal upon the conjunction of four input signals which comprise the Clear to Send signal JCTS1 from data set 24a, signals FC020 and TTS30 from the bit counter, shown in FIG. 12 of the calling terminal B, and signal FTRD0 from the 0-output terminal of the reset Reader Control Mode flip-flop 51 of the reader control logic of terminal B, shown in FIG. 13. Since these signals are positive at this time, the Reader Control Mode flip-flop 51 remains reset by the output signal from AND-gate 97. No reader action by the calling data set at terminal B is initiated since the Reader Control Mode flip-flop 51 is not yet set and the carrier wave from terminal B is terminated.

As soon as the carrier wave from data set 24b decays (drops out), the trailing edge of its Carrier On signal DOND0 at terminal A causes its AND-gate 95 to generate an output signal which sets its Request to Send flip-flop 87. The setting of flip-flop 87 at terminal A causes Duplex Mode flip-flop 94 at that terminal to set. The Request to Send flip-flop 87 at the calling terminal B is prevented from setting because Duplex Mode flip-flop 94 at terminal B remains set. Initially, flip-flop 94 was placed in this condition when flip-flop 87 at terminal B was originally set. Therefore, the enabling signal FDPX0 applied to one of the input terminals of AND-gate 95 remains negative making it impossible for AND-gate 95 to generate an output signal to set flip-flop 87. The duplex condition of terminal A is now reversed and terminal A at the remote end of the telecommunication line is now supplying the carrier wave.

The leading edge of this carrier wave from terminal A resets Duplex Mode flip-flop 94 at terminal B. The duplex conditions of terminals A and B are now both reversed. When Duplex Mode flip-flop 94 at terminal B is reset, a signal from its 0-output terminal is provided through a start read switch 103 to the Reader Control Mode flip-flop 51 in the reader control logic of terminal B, as shown in FIG. 13.

At the remote terminal A, the Clear to Send signal JCTS1 on terminal lead 36 of the data set 24a terminates its carrier wave after approximately 200 milliseconds have elapsed. The trailing edge of this carrier wave signal provides a signal at data set 24b of terminal B which is conjunctively combined in AND-gate 95 with positive signals FPUT0, JUPT0, FERR0, DPR00 and FDPX0. The output signal of AND-gate 95 is applied to an input terminal of OR-gate 93. The output signal of OR-gate 93 is applied to the set input terminal of the Request to Send flip-flop 87. This signal again sets flip-flop 87 to its 1-state. The signal from its 1-output terminal is applied to terminal 34 of data set 24b at terminal B and causes modulator 31 at terminal B to again supply a carrier wave to the transmission line. This time, however, the output signal FTRD1 of the Reader Control Mode flip-flop 51 of terminal B prevents immediate resetting of its Request to Send flip-flop 87. The output signal FTDR1 from flip-flop 51 is conjunctively combined in AND-gate 99 with the Clear to Send signal JCTS1 applied at its other input terminals from the data set 24a to provide output signals DTCX1 and DTCP0. The DTCX1 signal is conjunctively combined in AND-gate 145 at this time with signal TTS31 for generating an output signal for setting Start Reader Search flip-flop 131, shown in the Reader Control Logic of FIG. 13. The DTCP0 signal is used to reset the shift register 26, shown in FIG. 12, and to start the clocking mechanism 116, shown in FIG. 9. Data read by the paper tape reader may now be applied to terminal lead 35 of data set 24b for transmission to terminal A.

Terminating communication

Data communication may be terminated after the tape reading is completed by placing the data set at either or both terminals of the transmission line in the talk mode. This causes the interlock circuit of FIG. 7 to drop out and prevents further data communication.

Communication interrupts

Communication between the calling and called terminals may be interrupted if either terminal fails to respond with a carrier wave signal after the carrier wave from the other terminal has ceased. Several conditions may prevent a terminal from responding, namely:

(1) If its paper tape punch is inoperative or in the process of punching, the signal, DPR00 originating from the Feed Control flip-flop of the Punch Control Logic, shown in FIG. 19, will not result in conjunction in AND-gate 95 of FIG. 8. If conjunction does not occur in AND-gate 95, OR-gate 93 will not generate an output signal for setting Request to Send flip-flop 87 and a carrier wave cannot be generated.

(2) If the Punch Mode flip-flop 60, shown in FIG. 19, is not reset by an End-of-Block Code signal DZER1 from a previous punching operation, the negative signal FPUT0 from the 0-output terminal of the Punch Mode flip-flop 60 applied to AND-gate 95 of FIG. 8 prevents the Request to Send flip-flop 87 from setting.

(3) If an error condition occurs in the previous information received, the negative signal FERR0 from the Error Latch flip-flop 50 (shown in FIG. 20) applied to AND-gate 95 of FIG. 8 prevents conjunction from occurring in AND-gate 95 and the setting of the Request to Send flip-flop 87. A carrier wave is therefore not generated since modulator 31 of data set 24b is not energized.

When the terminal's carrier wave signal ceases, the signal DCOD0 will be generated at terminal lead 108 of the communication control logic of the terminal, shown in FIG. 8. This signal indicates that a blank tape or space marker will be generated.

If the Transmit Data flip-flop 52 of terminal B is set, signifying that terminal B has just completed a transmission and no carrier wave signal from the called data set 24a is received acknowledging receipt of the data sent by terminal B, a signal DXM01 is generated one-fourth of a second after the carrier wave from terminal A ceases. The signal DXM01 is the output signal from AND-gate 110 which is generated upon conjunction in AND-gate 110 of signals DCOD0 and FXME1. Signal DXM01 is transmitted to the set input terminal of a Reader Reverse flip-flop 111, shown in FIG. 8, causing it to set. The FREV1 signal from the 1-output terminal 112 of the Reader Reverse flip-flop 111 later causes the reader to back up one block of data on the transmitting terminal's paper tape and at the same time continuously providing marking signals to the transmission lines 21a and 21b. The calling terminal B will then retransmit the block of data for which an acknowledging signal was not received.

Clock generator and bit counter

Figure 9:
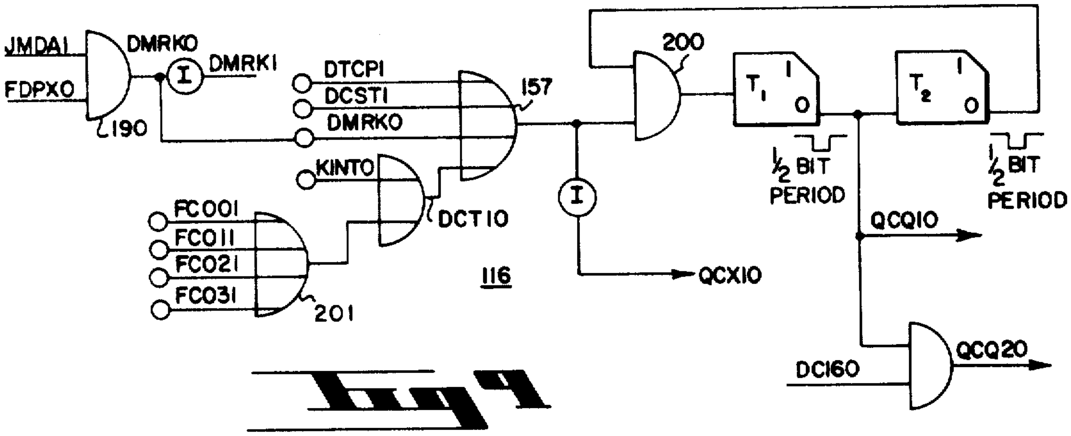
FIG. 9 is a schematic block diagram of the clock generator portion of the clock and bit counter block shown in FIG. 2.
Figure 10:
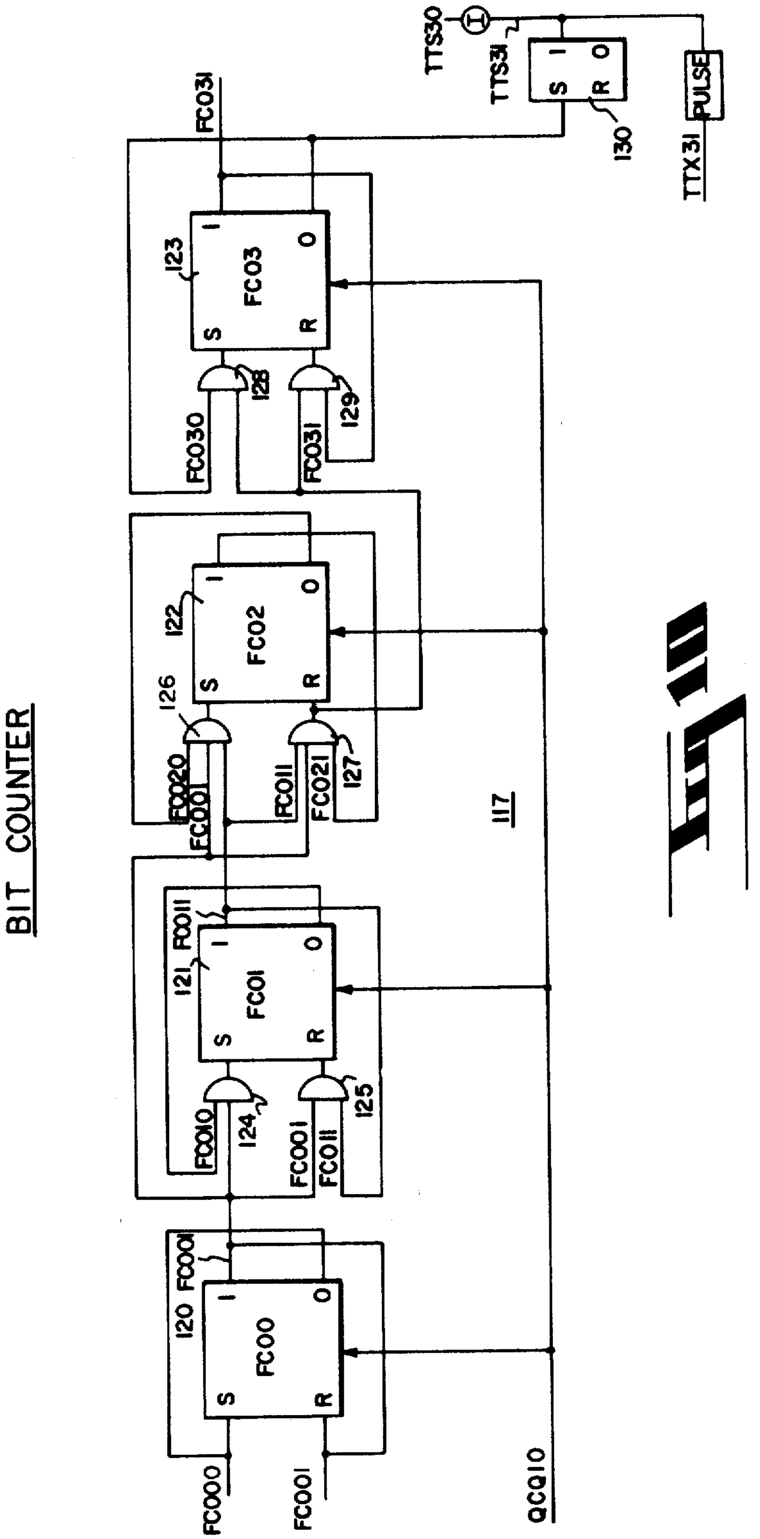
FIG. 10 is a schematic block diagram of the bit counter portion of the clock and bit counter block shown in FIG. 2.

The basic timing for the business machines 20a and 20b is supplied by clock generator and binary (bit) counter circuits forming a part of controller units 23a and 23b, respectively, shown in FIGS. 1 and 2. The clock generator 116, shown in FIG. 9, is a symmetrical or free running multivibrator running at a frequency of approximately 800 cycles per second, which is capable of being started and stopped by a logic control signal QCX11. The bit counter 117, shown in FIG. 10, is a standard binary counter circuit with counting enabled by the clock signals from the clock generator 116. The control signal QCX11 is developed by OR-gate 157 whenever a space signal DMRK0 is applied to one of its input terminals and is applied to one of the input terminals of AND-gate 200. The output signal of AND-gate 200 is applied to an input terminal of a monostable multivibrator $T_1$.

Clock generator 116 comprises two monostable multivibrators $T_1$ and $T_2$ so arranged that multivibrator $T_1$ triggers multivibrator $T_2$ into operation. The output signal of $T_2$ is used as the second input signal to AND-gate 200. Multivibrators $T_1$ and $T_2$ each comprise circuits similar to the flip-flop circuits described with reference to FIGS. 8 and 10 differing only in that they operate in one stable state rather than two stable states. They transfer from their reset states in which they are normally operating to their set states upon the application of trigger signals thereto. In their set states the monostable multivibrators represent the binary 1 (1-state) and in their reset states the binary 0 (0-state). The leads entering the left-hand sides of the monostable multivibrator symbols $T_1$ and $T_2$ shown in FIG. 9 provide the set input signals to these multivibrators.

Since multivibrator $T_2$ is normally in its reset state (0-state) its output signal from its 0-terminal enables AND-gate 200. When a space signal DMRK0 is applied to the other input terminal of AND-gate 200 at the start of the receipt of a character frame conjunction occurs in AND-gate 200. Multivibrator $T_1$ is transferred to its set state for a predetermined period of time depending on the time delay rating of the multivibrator which in this disclosure is ½ of a bit interval of time and then automatically returns to its reset state. The signal from the reset output terminal 0 of multivibartor $T_1$ is applied as the setting input signal to multivibrator $T_2$. Multivibrator $T_2$ is also set for a ½ bit period of time after which it resets with the reset 0-output terminal signal being applied as the enabling input signal to AND-gate 200, as heretofore explained. Since the space signal DMRK0 is no longer available to cause conjunction in AND-gate 200 and since any data signal may be a mark signal another signal must be available to cause conjunction in AND-gate 200 if a series of oscillations are to result from the operation of the clock generator 116.

The needed input signals to OR-gate 157 for causing conjunction in AND-gate 200 are obtained from OR-gate 201 the input signals of which are obtained from the bit counter shown in FIG. 10. One or more of the signals FC001, FC011, FC021 and FC031 will enable OR-gate 201 causing an output signal which will cause conjunction in AND-gate 200 resulting in the seting of multivibrator $T_1$ each time a bit is received during a charactor frame. When the counter 117 has returned to its zero condition and a mark is being transmited along the transmission line the clock generator 116 will be stopped.

The bit counter 117 is a device for counting according to the binary systems. A flip-flop may be used as a binary counter for counting a series of input signals such as pulses, by arranging for the flip-flop to be alternately set and reset at each input signal or pulse. Such a binary counter has only two different states. A plurality of N flip-flops may be cascaded, i.e., linked together, to form a binary counter having $2^N$ different states. AND-gates are used to link stages of the counter with the preceding stage to perform the function of applying a signal to that stage only when certain conditions exist.

FIGURE 10 illustrates a known binary counter employing four flip-flops, 120, 121, 122 and 123 forming a four-stage counter. Each flip-flop has a set terminal S, a reset terminal R, a clocking terminal C, a 0-output terminal and a 1-output terminal. The set input terminal of flip-flop 120 is adapted to receive a count initiating input signal FC000.

In the counter embodiment shown in FIG. 10, the maximum number which can be loaded in the counter is 16. The counter receives a clock pulse signal QCQ10 and is incremented by one for each clock pulse received. The clock pulse signal is a regularly produced signal provided by the clock generator 116. The counter is reset to zero when it reaches the count of 16.

Assume that flip-flops 120 through 123 are initially all in their 0-states, a positive count initiating signal or pulse FC000, when applied to the set input terminal of flip-flop 120, will set it upon the sequential application of a clock pulse signal QCQ10 to its clock terminal C. After the setting of flip-flop 120, a positive signal FC001 from its 1-output terminal is applied to one of the input terminals of each of AND-gates 124 and 125 associated with flip-flop 121. This output signal is also applied to reset terminal R of flip-flop 120 for resetting flip-flop 120 upon the occurrence of a second clock pulse QCQ10. Since the 1-output terminal of flip-flop 120 is connected to its reset terminal R, each incoming clock pulse QCQ10 alternately sets and resets this flip-flop. The counter, reading from left to right in FIG. 10 now contains a binary count of 1000 or a decimal count of 1.

The initial application of the input signal FC000 to flip-flop 120 enables AND-gate 124 and its output signal is applied as a setting signal to the setting input terminal of flip-flop 121. Flip-flop 121 is then set by the receipt of a second clock signal QCQ10 to its clocking terminal C. This same clock signal resets flip-flop 120. Thus, the counter now indicates a reset condition of flip-flop 120 and a set condition of flip-flop 121 indicating a binary count of 0100 or a decimal count of 2.

The setting of flip-flop 121 provides an output signal FC011 from its 1-output terminal which is applied to the other input terminals of AND-gate 125. Upon receipt of the third clock pulse QCQ10, flip-flop 120 is again set. Flip-flop 121 remains set. The setting of flip-flop 120 enables AND-gate 125. Flip-flops 120 and 121 are ready to be reset upon the receipt of the fourth clock pulse QCQ10. Binary counter 117 now indicates a binary count of 1100 or a decimal count of 3. The setting of flip-flops 120 and 121 provides enabling signals FC001 and FC011 from their 1-output terminals to the input terminals of AND-gate 126. The fourth clock pulse then resets flip-flops 120 and 121 and sets flip-flop 122. The counter now contains a binary count of 0010 or a decimal count of 4

Upon the occurrence and application of the fifth clock pulse QCQ10, to counter 117, flip-flop 120 is set, flip-flop 121 remains reset and flip-flop 122 remains set. Flip-flop 122 remains set since AND-gate 127 is not enabled because it does not receive an enabling signal FC011 from the 1-output terminal of flip-flop 121. The binary counter now has a binary count of 1010 or a decimal count of 5.

The sixth clock pulse applied to counter 117 resets flip-flop 120 and sets flip-flop 121. Flip-flop 122 remains set. Flip-flop 122 remains set since the enabling signal FC011 for AND-gate 127 is missing and flip-flop 122 cannot be reset. The binary count in counter 117 is now 0110 or a decimal count of 6.

Upon the occurrence of the seventh clock pulse, flip-flops 120, 121 and 122 are set indicating a binary count of 1110 or a decimal count of 7. An eighth clock pulse resets flip-flops 120, 121 and 122 and sets flip-flop 123. Flip-flop 123 is set since the output signal of AND-gate 127 applied to an input terminal of AND-gate 128 enables AND-gate 128 to set flip-flop 123. The binary count of counter 117 is now 0001 or a decimal count of 8. The ninth clock pulse QCQ10 then sets flip-flop 120. Flip-flops 121 and 122 remain reset since AND-gates 124 and 126 have not been enabled by input signals FC001 and FC011. respectively. Flip-flop 123 remains set upon the occurrence of the next clock pulse QCQ10 since AND-gate 129 has not been enabled by an output signal from AND-gate 127 to reset flip-flop 123. Binary counter 117 now represents the binary value of 1001 or a decimal value of 9.

With each succeeding clock pulse QCQ10, the counter changes until the binary count 1111 is reached which represents a decimal value of 15. Upon the sixteenth clock pulse, the counter returns to a binary count of 0000 or a decimal value of 0.

In the embodiment disclosed, timing control periods are generated by the counter. These control periods are identified herein as counts 1 through 16 rather than decimal values 0 through 15, respectively. Thus, in the resting state the counter is called a count of 1 equal to decimal 0. This condition may be expressed in the equation form as follows:

$$DCT1 = FC000\ FC010\ FC020\ FC030$$

Once the clock generator 116 starts the counter advances through the count of 16 supplying an additional time period TTS31 at intervals of sixteen clock pulses. The sixteen count intervals between TTS31 signals provide time for the reception or transmission twice of each character transmitted along the transmission line between terminals A and B, once in the "true" bit formation followed after the count of eight by the same character in the "inverse" bit formation. After each count of 16 the circuit returns to its preset count state of 1.

When flip-flop 123 changes from its set to its reset state at the sixteenth clock synchronizing pulse, monostable multivibrator 130 is triggered.

Monostable multivibrator 130 is a circuit similar to the flip-flop circuit described with reference to FIGS. 8 and 10 differing only in that it operates in one stable state rather than two stable states. It transfers from its reset state in which it is normally operating to its set state upon the application of a trigger signal thereto. In its set state, the monostable multivibrator represents the binary 1 (1-state) and in the reset state, the binary 0 (0-state). The lead entering the left-hand side of the monostable multivibrator symbol shown in FIG. 10 provides the set input signal. When the set input signal goes positive, the monostable multivibrator is transferred to its 1-state. It will stay in this set state for a predetermined period of time depending on the time delay rating of the multivibrator and will then automatically return to its stable state (i.e., its reset state). Because the monostable multivibrator returns by itself to its reset state, no reset input is required. The period of time the multivibrator remains in its set state can be controlled by the selection of electronic components used to build the monostable multivibrator circuit.

The monostable multivibrator 130 generates a direct current signal TTS31 and a raising edge pulse signal TTX31 immediately after the last data bit of a character has been transmitted. This signal from the monostable multivibrator 130 resets the 8th Column Memory flip-flop 150, shown in FIG. 13. In addition, the monostable multivibrator 130 supplies an enable signal TTS31 to the set input logic of the Start Reader Search flip-flop 131, shown in FIG. 13.

Figure 11:
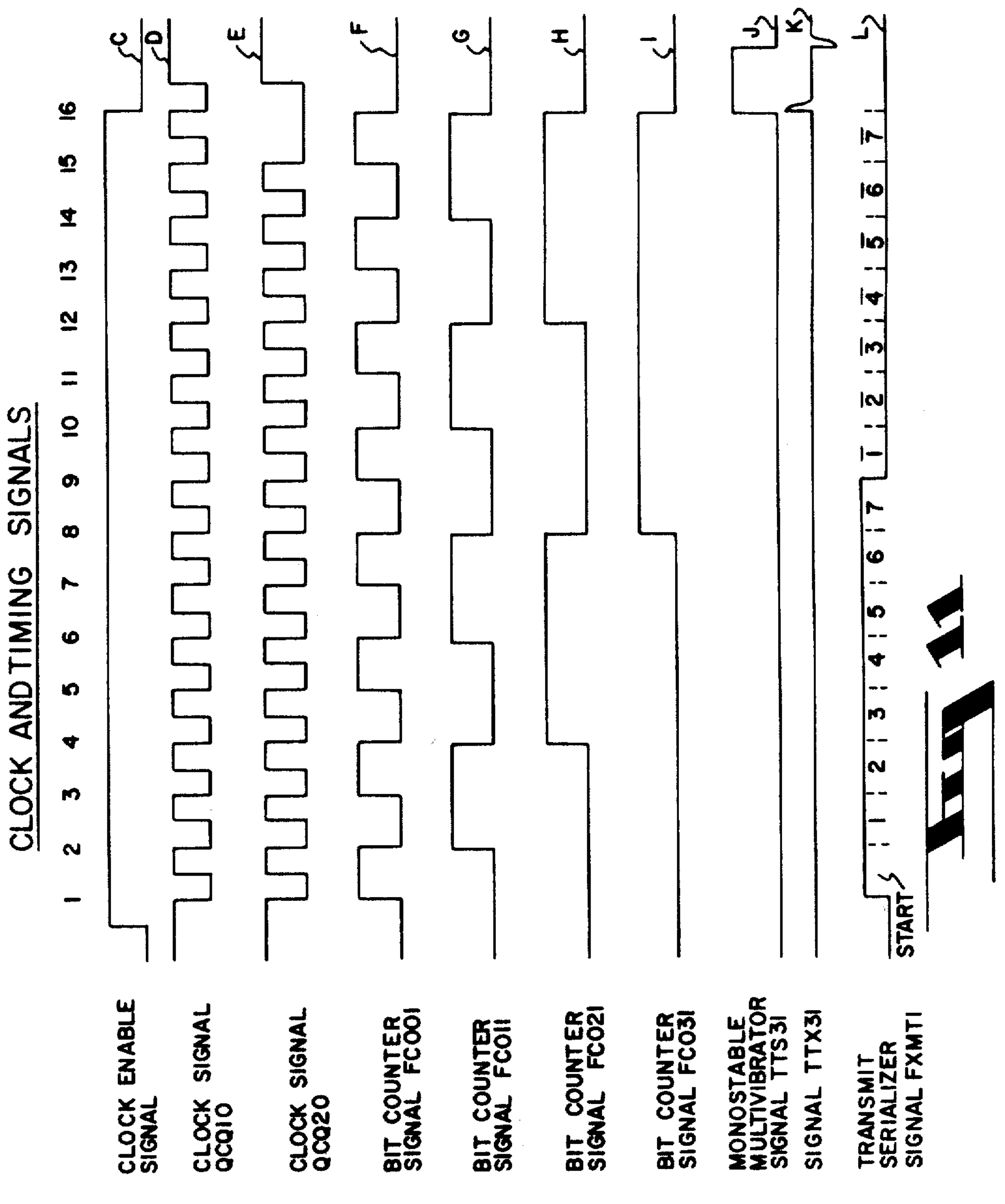
FIG. 11 is a diagrammatic illustration in chart form of the clock and timing signals provided by the clock and bit counter logic shown in FIGS. 2, 9 and 10.

FIGURE 11 is a clock synchronizing pulse timing chart where:

Waveform C illustrates graphically the time that the clock generator 116 is enabled.

Waveforms D and E illustrate graphically the output signals of the QCQ10 and QCQ20 terminals of the clock generator 116.

Waveform F illustrates graphically the output signals of the 1-output terminal of flip-flop 120 of binary counter 117 with reference to the clock synchronizing pulses.

Waveform G illustrates graphically the output signals of the 1-output terminal of flip-flop 121 of binary counter 117 with reference to the clock synchronizing pulses.

Waveform H illustrates graphically the output signals of the 1-output terminal of flip-flop 122 of binary counter 117 with reference to the clock synchronizing pulses.

Waveform I illustrates graphically the output signals of the 1-output terminal of flip-flop 123 of binary counter 117 with reference to the clock synchronizing pulses.

Waveforms J and K illustrate graphically the output signals TTS31 and TTX31, respectively, of the monostable multivibrator 130 with reference to the output signals of various states of the binary counter and the clock synchronizing pulses.

Waveform L illustrates graphically the output signals of the Transmit Serializer flip-flop 140, shown in FIG. 16, with reference to the clock synchronizing pulses.

Shift register

Data transmitted from the calling terminal B to the called terminal A is read by the tape reader of the calling terminal and transferred in parallel through its terminals 132*a*–132*g* to flip-flops FSH1–FSH7 of its shift register 26, shown in FIG. 12. The transfer of data from the tape reader to the shift register 26 takes place when conjunction occurs in AND-gates 133*a*–133*g* between the data input signals from columns 1 through 7 of the tape reader and the output signal from AND-gate 154. AND-gate 154 generates an output signal for enabling AND-gates 133*a*–133*g* when signals indicating that the 8th Column Memory flip-flop 150 of FIG. 13 is reset, the clock generator 116 has not started, the set signal into the Start Search flip-flop 131 is negative, and the Reader Search Complete signal DDSC1, shown in FIG. 13, has been received from the tape reader.

Shift register 26 comprises a plurality of flip-flops, one flip-flop for each bit of the data to be stored therein. The shitf register, shown in FIGS. 2 and 12, comprises seven flip-flops for storing information punched on paper tape. The flip-flops of the register are identified according to the register designation and the numerical significance of the data bits stored therein. Thus, the flip-flops of shift register 26 are designated FSH1 through FSH7.

The data in shift register 26 is serially shifted from lower to higher numbered bit positions of the register. In such registers, the entire contents of the register are transfered by simultaneous shifts to the next higher numbered bit positions at the time of receiving clock synchronizing signal QCQ20.

Temporary signal storage is provided to permit a register flip-flop to change its state at the same time that i s contents are being transmitted to another register flip-flop, i.e., during the serial shift of data in the register. This temporary signal storage is usually supplied by capacitors in the register and in the flip-flop logic input circuits. These capacitors store the logic signal levels from the output terminals of a data transmitting flip-flop prior to the occurrence of the clock signal that causes the data transmitting flip-flop to change its state and the corresponding data-receiving flip-flop to receive the contents of the data-transmitting flip-flop. When the clock pulse is applied to the register, the contents of the data-transmitting flip-flops are held in the capacitors sufficiently long for the data-receiving flip-flop to respond thereto, while the data-transmitting flip-flop may simultaneously have the state thereof changed. Similarly, where the contents of one flip-flop are transmitted to another through logical gates, the flip-flop input capacitors provide temporary storage for the input logic signal levels. Since this type of shift register is well-known in the art, detailed structure of shift register temporary storage circuitry has been omitted.

Data in shift register 26 is serially shifted from left to right as shown in FIG. 12, except the bit in flip-flop FSH7 which is shifted into the flop-flop FSH1 through a logic circuit comprising a plurality of AND- and OR-gates 166, 167, 168, 170 and 178. If flip-flop FSH7 is set, a positive or 1-output signal from its 1-output terminal is applied to one of the input terminals of AND-gate 167. Since the other input signal DTCX1 to AND-gate 167 is also positive at this time because it is a signal resulting from the conjunction of Tape Read and Clear to Send Signals, AND-gate 167 provides a positive output signal to OR-gate 166. OR-gate 166 generates an output signal DSET1 which is applied to AND-gate 168. The other input signal DC160 to AND-gate 168, indicating that the count of sixteen has not been reached in counter 117, is positive at this time causing conjunction in AND-gate 168 and resulting in the setting of flip-flop FSH1 upon occurrence of the next clock pulse QCQ20. If flip-flop FSH7 was in its reset state, conjunction would not occur in AND-gate 167 as explained above, resulting in a negative output signal from OR-gate 166. Inverter 169 inverts this negative signal DSET1 to a positive signal DSET0 to reset flip-flop FSH1 upon occurrence of the next clock pulse QCQ20. Thus, the character transmitted to shift register 26 by the tape reader is continuously recirculated and shifted through the register as long as clock pulses are applied to the flip-flops. Shifting of the bits through register 26 occurs during each of the sixteen counts of the bit counter resulting in the character read by the tape reader being shifted twice through the shift register.

The first bit transmitted to the transmission line is a space bit and this condition is assured since Transmit Serializer flip-flop 140 of FIG. 16 is set upon the occurrence of the first clock synchronizing pulse by the signal DCT11 applied to OR-gate 152. This positive signal indicating that counter 117 is in its reset state is conjunctively combined in AND-gate 153 with positive signals FREV0, DC160, DTCX1 and DZLC0. These letter signals indicate that the Reader Reverse flip-flop 111 of terminal A is reset, that count 16 is not in counter 117, that Tape Read and Clear to Send signals have been received by the Communication Control Logic and that tape other than the tape leader portion of it is in the reader at that time.

The bits of the character read by the tape reader are transferred into the shift register through column terminals 132*a* through 132*g* without a clock pulse since the voltage level of the signals representing 1 bits are sufficiently high to set the flip-flops of the register.

The bit content of flip-flop FSH1, namely the character bit received from column 7 of the reader will not be utilized by the Transmit Serializer flip-flop 140 as the first signal transmitted to the transmission line.

Upon the occurrence of the second clock synchronizing pulse QCQ20, the bit originally shifted from flip-flop FSH7 to flip-flop FSH1 of register 26 is now transmitted to either AND-gate 151 or OR-gate 154 of FIG. 16, depending on its polarity to either set or reset Transmit Serializer flip-flop 140 in addition to being shifted to flip-flop FSH2 of the shift register.

Each of the seven bits of the character read by the tape reader is shifted through register 26 and each bit is also transmitted to the Terminal Serializer flip-flop 140 for transmission to the called terminal.

The second time these seven bits of the character are shifted through the shift register, they are transmitted as input signals to AND-gate 150 or OR-gate 155. Each bit is inverted by this logic circuitry from the polarity condition it had during its first transmission along the transmission line to the opposite polarity condition. For example, a one bit from terminal FSH11 of flip-flop FSH1 of the shift register 26 is applied to OR-gate 154 of the Transmit Serializer flip-flop 140 of FIG. 16. The output signal of OR-gate 154 is conjunctively combined in AND-gate 156 with the output signal of OR-gate 155 and the DCT10 signal. The output signal of AND-gate 156 applied to OR-gate 149 results in an output signal from OR-gate 149 which resets Transmit Serializer flip-flop 140 resulting in a mark being transmitted along the transmission line to the called terminal.

When this same bit reaches the flip-flop FSH1 of register 26 during the second time the read character is shifted through register 26 it is transmitted as an input signal to AND-gate 150 of the logic circuit of the Transmit Serializer flip-flop 140. Since the other input signal FC031 to AND-gate 150 is positive at this time, conjunction occurs in AND-gate 150 resulting in an output signal which is applied as an input signal to OR-gate 152. The output signal of OR-gate 152 is applied as an input signal to AND-gate 153. The other input signals to AND-gate 153 are positive at this time resulting in an output signal from AND-gate 153 which sets flip-flop 140 resulting in a space being transmitted along the transmission line to the called terminal.

Thus, the second time the character is shifted through register 26, each bit is inverted by the logic associated with the Transmit Serializer flip-flop 140 and a character which is an inverse representation of the character read is transmitted along the transmission line in the character frame of the transmitted data.

DESCRIPTION OF READ TAPE MODE OF OPERATION

Figure 14:
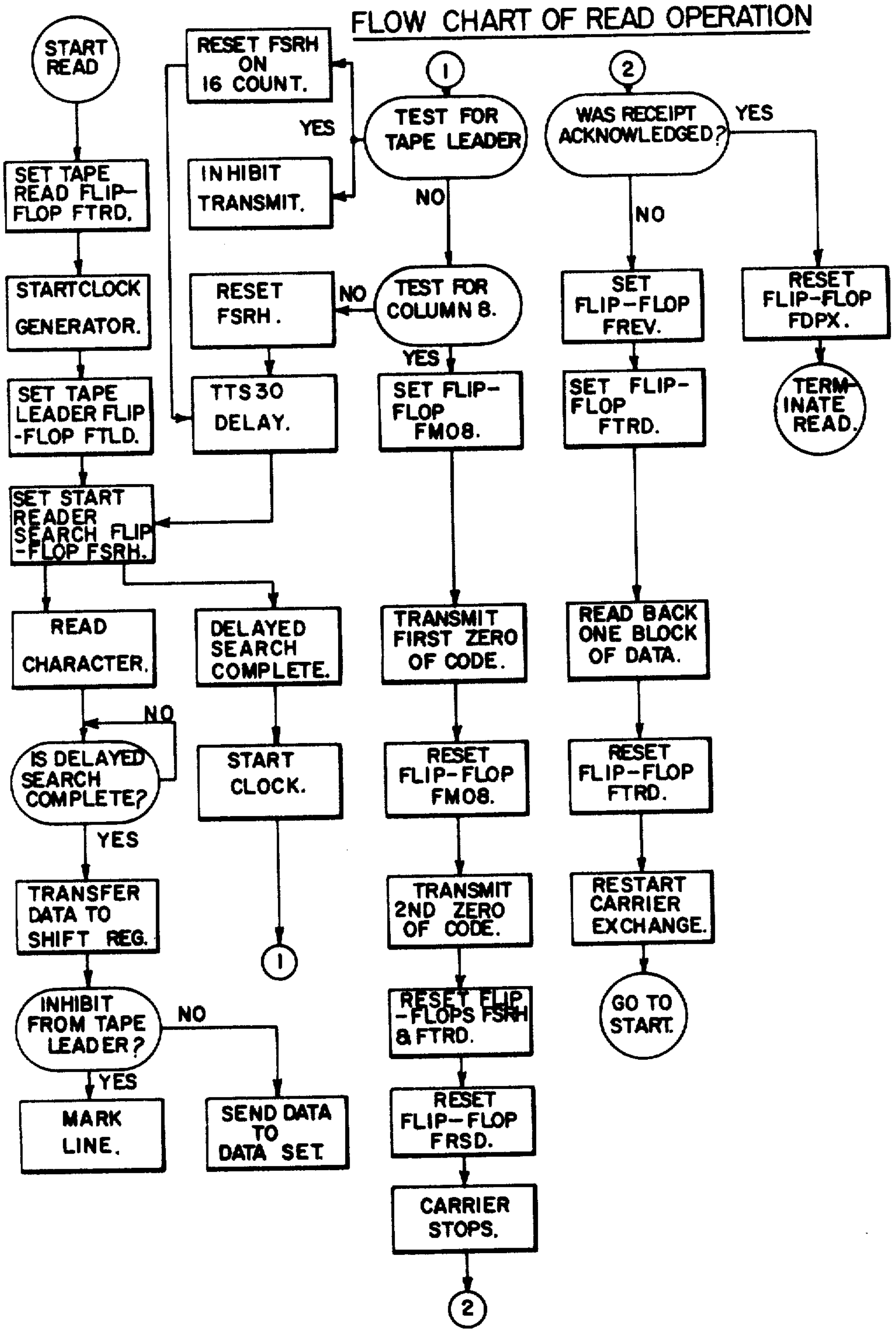
FIG. 14 is a flow chart of the read operation of the structures shown in FIGS. 1 and 2.

The flow chart of the Read Operation, shown in FIG. 14, illustrates graphically the sequence of operation in the reading of a paper tape at one terminal and transmitting the data read across the transmission lines to the other terminal.

Set Tape Read flip-flop FTRD

Assume initially that a carrier exchange has been accomplished in the manner heretofore explained. When a return carrier wave is received from the distant called terminal A, the Tape Read flip-flop 51 of terminal B, shown in FIG. 13, will be set by an FDPX0 signal if the Start Read Switch 103 is closed. The FDPX0 signal is received from the Duplex Mode flip-flop 94, shown in FIG. 8, which was reset by the leading edge of the return carrier wave. Flip-flop 51 may also be set by the DXM00 signal when it is desired to read backwards to retransmit a block of information. Still further, flip-flop 51 may also be set by a FPUT1 signal from the Punch Mode flip-flop 60, shown in FIG. 19, when the calling terminal B is in the unattended mode, to initiate a tape read operation from the called terminal after a block of information has been correctly received and punched. Paper tape must be in the reader 22*b* before the Tape Read flip-flop 51 can set in its 1-state. The reader eject signal JREC1 holds Reader Control Mode flip-flop 51 reset if paper tape is not present in the read station.

Start clock generator

Figure 6:
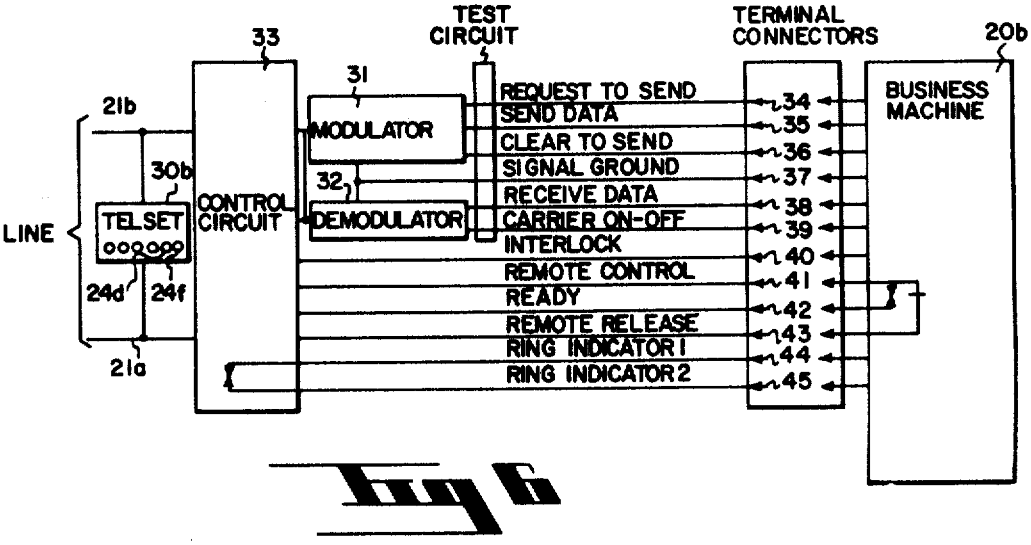
FIG. 6 is a simplified block diagram of the data sets shown in FIGS. 1 and 2.

After Tape Read flip-flop 51 in FIG. 13 is set, its output signal FTRD1 from its 1-output terminal is applied to one of the input terminals of AND-gate 99 in FIG. 8. The other input terminal of AND-gate 99 is provided with a Clear to Send signal JCTS1 from terminal lead 36 of the data set 24*b* shown in FIG. 6. Since conditions for conjunction in AND-gate 99 are now satisfied, the signal DTCP1 resulting from the rising edge of the output signal of AND-gate 99 is then applied to one of the input terminals of OR-gate 157 which starts the clock initially. The signal DTCP1 is also applied to the input terminals of OR-gate 136 shown in FIG. 12. The output signal of OR-gate 136 is then used to reset shift register 26, shown in FIGS. 2 and 12. It should be noted that the resetting of the shift register uses a signal voltage larger than normal logic level, thus a clock synchronizing signal QCQ20 is not required.

Transmission of first code

Figure 15:
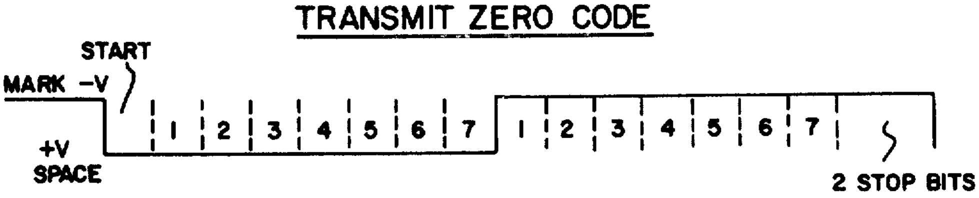
FIG. 15 is a diagrammatic illustation of a zero code.

With zeros in the shift register 26, shown in FIG. 12, a space (start) bit followed by seven additional space bits followed by seven mark bits (zero code shown in FIG. 15) is sent to the data set at the called terminal A. According to well-known Teletype techniques, the data applied to the transmission lines 21*a* and 21*b* by the data set is in the form of pulses of two significant values which may, for example, represent relatively negative or positive values of voltage. For the purpose of the following description, it will be understood that the line signal code employed to transmit a character consists of various combinations of marking and spacing intervals. Each group of signals is preceded by a start or initial pulse and is usually followed by a stop pulse to maintain unison between the transmitting equipment. Depending on the code utilized, however, the number of succeeding signals after the start or initial pulse and before the stop pulse may vary considerably. As shown in FIG. 15, after the initial or start pulse seven succeeding signal pulses are provided followed by seven inverse signal pulses of the first seven signal pulses.

The initial drop in voltage, as shown in FIG. 15, from the mark designation to the space designation, represents the start of the start pulse. Each character may represent any one of the decimal numerals 0–9, any one of the letters of the alphabet, and certain other special symbols such as punctuation marks, etc. Each character, as shown in FIG. 15, contains information periods, one for each bit received, wherein the data varies according to the type of signal received. A mark which occurs for two successive information periods would result in two bits of information received during two information periods. A single mark or space would be an information period.

The Transmit Serializer flip-flop 140 shown in FIG. 16 is normally reset causing marking signals to be applied to the transmission lines 21_a_ and 21_b_ through the data terminal lead 35 of data set 24_b_ each time clock synchronizing pulse QCQ10 is applied to its clocking terminal C. The DTCX1 signal, resulting from the conjunction in AND-gate 99 of the 1-output terminal signal FTRD1 and the Clear to Send signal JCTS1 received from the data set 24_b_, is applied to AND-gate 153 shown in FIG. 16. The inverted signal DTCX0 derived from the DTCX1 signal is applied to OR-gate 149. The output signal from OR-gate 149 retains Transmit Serializer flip-flop 140 reset until Reader Control Mode flip-flop 51 is set and a Clear to Send signal is received from data set 24_b_. Since Reader Control Mode flip-flop 51 is now set, Transmit Serializer flip-flop 140 also may be set when conjunction of input signals to AND-gate 153 occurs.

With zeros in the seven flip-flops of the shift register 26 due to the resetting of the shift register, a space (start) bit followed by seven additional space bits and seven mark bits are transmitted through the Transmit Serializer flip-flop 140 to the data set 24_b_ for transmission to terminal A as a zero code. As noted from FIG. 16, and explained heretofore signals FC031 and FC030 from flip-flop FCO3 of bit counter 117 are applied one to each of the input terminals of AND-gates 150 and 151. The other input terminals of AND-gates 150 and 151 have applied thereto signals FSH11 and FSH10 from the shift register 26. AND-gate 151 is enabled during the first eight counts of bit counter 117 by signal FC030, and during the shifting of the preset zeros out of the shift register 26 signal FSH10 is generated which is conjunctively combined in AND-gate 151 with signal FC030 to provide output signals. These output signals are applied to one of the input terminals of OR-gate 152. The output signal of OR-gate 152 is applied to one of the input terminals of AND-gate 153. Since the signal FREV0, DC160, DTCX1 and DZLC0 are all positive at this time they are conjunctively combined in AND-gate 153 with the output signal of OR-gate 152 to produce output signals which are applied to Transmit Serializer flip-flop 140 to set it.

After the first seven zero bits are shifted out of shift register 26 to Transmit Serializer flip-flop 140, the second seven zero bits are shifted out to Transmit Serializer flip-flop 140. The second seven zero bits reset and retain reset flip-flop 140. Signals FC031 and FSH10 from bit counter 117 and shift register 26 cause OR-gates 154 and 155, respectively, to generate output signals which are conjunctively combined in AND-gate 156 with a signal DCT10 from the bit counter to generate an output signal which is applied to OR-gate 149. OR-gate 149 generates an output signal for resetting Transmit Serializer flip-flop 140. Flip-flop 140 remains reset for counts 9 through 16 of counter 117 while seven inverse pulses are transmitted to the data set 24_b_, thereby completing the transmission of the first zero code to terminal A.

At the first clock synchronizing pulse when signal DCT11 is positive indicating that counter 117 is reset and while the other input signals to AND-gate 153 are positive to cause character transmission, the Transmit Serializer flip-flop 140 is set to transmit a start or space bit to the transmission lines. On the last or sixteenth clock synchronizing pulse of a character sequence when signal DC161 of the counter 117 is positive, the Transmit Serializer flip-flop 140 is reset. Flip-flop 140 is reset by the DC161 signal being applied to an input terminal of OR-gate 149, the output signal of which is applied to the reset terminal of flip-flop 140. This resetting of flip-flop 140 assures the return to the marking state of the terminal after the sixteenth count of counter 117. Thus, the serial data bits transmited by a data set are framed by start and stop bits. Every character is transmitted in the same manner.

The setting and resetting signals of the Transmit Serializer flip-flop 140 may be expressed by the following equations:

$$FXMT1 = FREV0\ DC160\ DZLC0\ DTCX1 \cdot (DCT11 + FSH11\ FC031 + FSH10\ FC030)$$

$$FXMT0 = DCT10\ (FSH10 + FC030)\ (FSH11 + FC031) + DC161 + DTCX0 + (FTLD1)\ (DTZR1)$$

Reference is made to the Chart entitled Glossary and Index of Signals forming a part of this specification for identification of the various signals involved.

Set Tape Leader flip-flop FTLD

At the same time that Transmit Serializer flip-flop 140 of FIG. 16 is set and the output signal DTCP1 from AND-gate 99 (shown in FIG. 13) is generated to start the clock generator 116, the Tape Leader flip-flop 141 of FIG. 13 is also set. The output signal DTCP1 from AND-gate 99 is an input signal to OR-gate 142 which sets Tape Leader flip-flop 141. The other input signal to OR-gate 142 is a DXM01 signal which is derived from AND-gate 110 of FIG. 8. This signal functions to set Tape Leader flip-flop 141 prior to reverse tape reading. Flip-flop 141 will remain set until a non zero character is detected by the reader of the reader/punch structure 22_b_. The output signal FTLD1 from the 1-output terminal of flip-flop 141 is conjunctively combined in AND-gate 143′ of FIG. 16 with the signal DTZR1 which is positive only while reading a tape zero (blank tape) code derived from the reader/punch structure 22_b_ to hold the Transmit Serializer flip-flop 140 reset, thereby causing flip-flop 140 to supply marking signals to the data terminal lead 35 of data set 24_b_ shown in FIG. 6. The marking of the transmission line occurs until the tape leader has passed through the reader of the reader/punch structure and a non zero character has been detected. It should be noted that the first zero code is transmitted prior to attempting to read the punched tape, consequently its transmission is not inhibited by the Tape Leader flip-flop 141.

Start Reader Search

When the first zero code shown in FIG. 15 is transmitted and at the count of 16 of the binary counter 117, the monostable multivibrator 130 is energized and produces the output signal TTS31 shown in FIG. 10. The TTS31 and DTCX1 signals are conjunctively combined in AND-gate 145 (shown in FIG. 13). The resulting output signal DSRR1 from AND-gate 145 is used to set the Start Reader Search flip-flop 131.

The Search Complete signal DDSC1 returned from the reader/punch structure 22_b_ causes conjunction to occur in AND-gate 154 of FIG. 12 resulting in the parallel transfer of data bits from the reader/punch structure **22*b* to the shift register 26 shown in FIG. 12. This parallel transfer of data bits is accomplished without the use of clock synchronizing pulses QCQ20. During the reading of the tape leader, however, the transmission of data from the shift register to the transmission lines is inhibited by the signals FTLD1 and DTZR1 shown in FIG. 16 as input signals to AND-gate 143. Transmit Serializer flip-flop 140** is retained in its reset condition by these signals if a tape leader is being fed into the reader/punch structure.

The Start Reader Search flip-flop 131 is reset at the count of sixteen of counter 117 during the reading of the tape leader via AND-gate 143 in FIG. 13. After the leader, the Start Search flip-flop is reset by a conjunctive combination of signals DZEX1, FM080, DCST1 and the inverted setting input signal DSRR1 from AND-gate 145. The Start Clock Generator signal DCST1 is normally the enabling signal for resetting flip-flop 131 except when a reader zero code is detected (signal DZEX1 is then negative) or when the 8th Column Memory flip-flop 150′ shown in FIG. 13 is set.

After the Start Reader Search flip-flop 131 is reset, the Search Complete signal DDSC1 decays. The reader then advances to the next character on the paper tape and awaits the next Start Search signal FSRH1 from the control logic shown in FIG. 13. The sequence is repeated for each character until the end of the block of data is reached.

Thus, a Start Search signal is sent to the reader of the reader/punch structure **22*b*. A Search Complete signal is returned initiating transfer of the character to the shift register 26. The clock generator 116 is started and the character is transmitted through the data set 24*b* and across the transmission lines 21*a* and 21*b*** to terminal A. The reader of the reader/punch structure now advances and waits for the next Start Search signal.

End of block recognition

A punch in column 8 only of the paper tape being read by the reader of the reader/punch structure **22*b* normally signifies the end of the block of characters on the tape. When this character is read, terminal B transmits two successive zero codes, resets the Read Control Mode flip-flop 51 shown in FIG. 13, and stops the generation of synchronizing clock pulses by the clock generator 116**.

The 8th Column Memory flip-flop 150′ shown in FIG. 13 is set by the signal JRS81 which is generated by the reader of the reader/punch structure **22*b* upon reading the 8th column punched hole. Flip-flop 150′ may also be set by blank tape signal DTZR1 when accompanied by a Tape Leader flip-flop reset signal FTLD0. The setting of flip-flop 150′** may be expressed in equation form as follows:

$$FM081=JRS81+DTZR1\ FTLD0 \text{ (rising edge)}$$

Flip-flop 150′ remains set until reset by the TTX31 signal of the monostable multivibrator 130 shown in FIG. 10, occurring after the transmission of one zero code.

The Start Reader Search flip-flop 131 shown in FIG. 13 remains set during the End-of-Block transmission signal since the signal FM080 from the 8th Column Memory flip-flop 150 inhibits its resetting by prohibiting a conjunction of signals in AND-gate 151 from generating a resetting signal. As a result of this action the reader remains on the End-of-Block termination character or 8th column hole for two character periods of time.

A second code signal immediately follows the first zero code signal since the signal DCST1, resulting from the set condition of flip-flop 131, again starts the second character cycle of the clock generator 116. The Start Reader Search flip-flop 131 cannot be reset at this time because seven columns read from the reader are zero; therefore, signal DZEX1 is negative and inhibits AND-gate 151 of FIG. 13 from generating a resetting signal. As a result, when bit counter 117 of FIG. 10 reaches the count of 16, signals are available to reset the Reader Mode Control flip-flop 51 shown in FIG. 13. The resetting of Reader Control flip-flop 51 may be set forth in equation form as follows:

$$FTRD0=FM080\ DC161\ DDSC1\ FTLD0$$

When flip-flop 51 resets it provides an enabling signal to AND-gate 97, shown in FIG. 8, causing the resetting of the Request to Send flip-flop 87. In addition to the application of signal FTRD0 to one of the input terminals of AND-gate 97, the signals FC020 and TTS30 are also applied to this gate for timing purposes to insure that the carrier transmitted from data set **24*b*** is not turned off until a delayed time after all bits of the last character of the block of characters have been transmitted. The resetting signal may be identified in equation form as follows:

$$FRSD0=FC020\ TTS30\ FTRD0\ JCTS1$$

The Start Reader Search flip-flop 131 in this case is reset by the third input to OR-gate 192 when flip-flop FRSD0 goes positive.

FIG. 17 illustrates in diagrammatic chart form the timing and logic signals involved in the tape read operation discussed above. The chart particularly illustrates the timing and logic signals involved during the reading and transmission of the first zero code, the tape leader and the first character.

Read termination function

When terminal B discontinues its carrier wave after transmitting a block of characters read from the paper tape, the remote terminal A will acknowledge receipt of the message by transmitting a return carrier signal. If an error condition in the transmitted data prevented setting of the Request to Send flip-flop 87 at the remote terminal, a return carrier signal from terminal A will not be transmitted and the sending station, for example, terminal B will retransmit the last block of data.

When the return carrier wave signal JOND0 arrives at data set **24*b* of terminal B in response to setting of the Request to Send flip-flop 87 at the terminal A indicating the correct receipt of data by the terminal A, the Duplex Mode flip-flop 94** at terminal B is reset. The read operation of the tape reader at terminal B may now proceed with the next block of data. The reading will continue block by block until the tape supplied to the reader ends.

Retransmission of data

If a return carrier wave signal JOND0 at terminal B signifying correct receipt of data is not received from terminal A by the transmitting terminal B, the transmitting terminal will set its Reader Reverse flip-flop 111, shown in FIG. 8, one quarter of a second after the carrier wave signal of the transmitting terminal is turned off. The setting of flip-flop 153 may be defined in equation form as follows:

$$FREV1=FXME1\ DCOD0$$

wherein the FXME1 signal indicates that the Transmit Memory Data flip-flop 52 shown in FIG. 8 is set, and the DCOD0 signal indicates that the carrier wave of the transmitting terminal has stopped after one quarter of a second delay. The Transmit Memory Data flip-flop 52 may be previously set if the Transmit Serializer flip-flop 140 shown in FIG. 17 resets thereby providing "spacing" signals to the transmission lines. Transmit Data flip-flop 52 may only be reset by input signals KINT0, FDPX0 or signal DTCP1 to OR-gate 154. The signal KINT0 occurs when interlock relay 48 of the data set, shown in FIG. 7, is de-energized, thereby producing the signal KINT0 at terminal 49. The signal FDPX0 is generated by the Duplex Mode flip-flop 94 indicating a received condition. The DTCP1 signal is derived from the output terminal of AND-gate 99 upon the conjunction of Reader Control Mode and Clear to Send input signals FTRD1 and JCTS1, respectively.

The Reader Reverse flip-flop's 1-output terminal signal FREV1 is transmitted to the reader of the reader/punch structure **22*b* to control the direction of reading during the next read operation. The same conjunction of logic signals, FXME1 and DCOD0 in AND-gate 110 causing the generation of the logic signal DXM00 that sets the Reader Reverse flip-flop 111 also sets the Reader Control Mode flip-flop 51 shown in FIG. 13. Because carrier signals from both terminals are now off, communication is resumed by terminal B after a 2-second delay. The Request to Send switch in terminal B is closed and conjunction occurs in AND-gate 92 thereby setting Request to Send flip-flop 87**.

The logic circuits for the read tape operation being activated, the paper tape is read backwards until an End-of-Block code signal is sensed. During this backward read of the tape, terminal B does not transmit data since the Reader Reverse flip-flop's 0-output terminal signal FREV0 is negative at this time. This negative signal prevents conjunction from occurring in AND-gate 153 of FIG. 16 and the generation of an output signal to set the Transmit Serializer flip-flop 140, thereby keeping a "marking" signal on the data line terminal 35 of data set **24*b***.

When the reader at terminal B reaches the End-of-Block code signal, the Reader Control Mode flip-flop 51 is again reset which in turn resets the Reader Reverse flip-flop 111. The reader halts at the end of the last good block of data. Terminal A cannot respond with a carrier wave acknowledging good communication in the manner heretofore explained. After the carrier wave from terminal A stops the sending terminal B retransmits the block of data in the same manner as heretofore explained. First a zero code is transmitted followed by the block of data and ending with two zero terminating codes.

Attempts to transmit the block of data will continue automatically until correct receipt of the transmitted data is acknowledged or until an operator intervenes.

DESCRIPTION OF PUNCH TAPE MODE OF OPERATION

Figure 18:
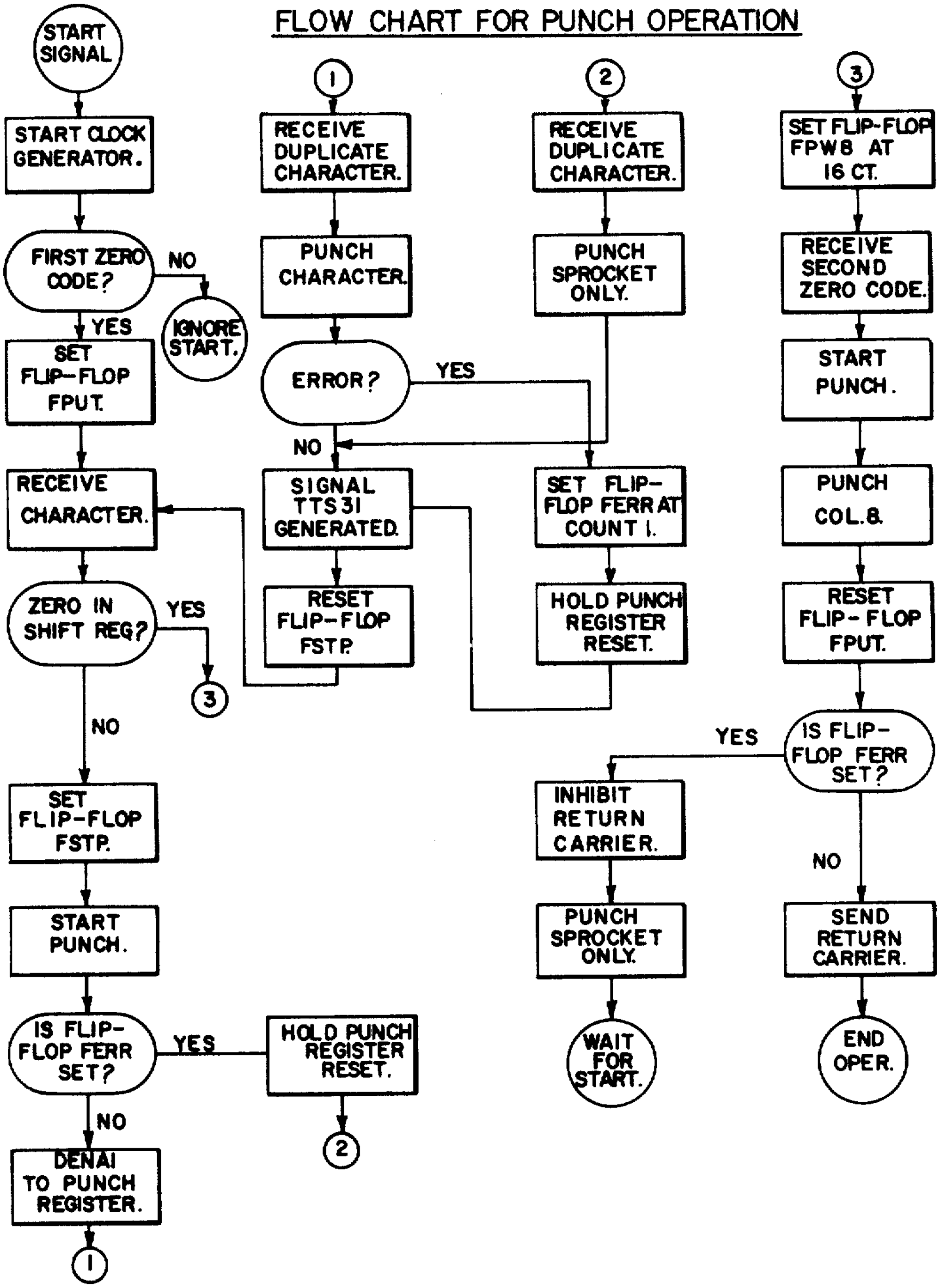
FIG. 18 is a flow chart of the punch operation of the structure shown in FIGS. 1 and 2.
Figure 14:
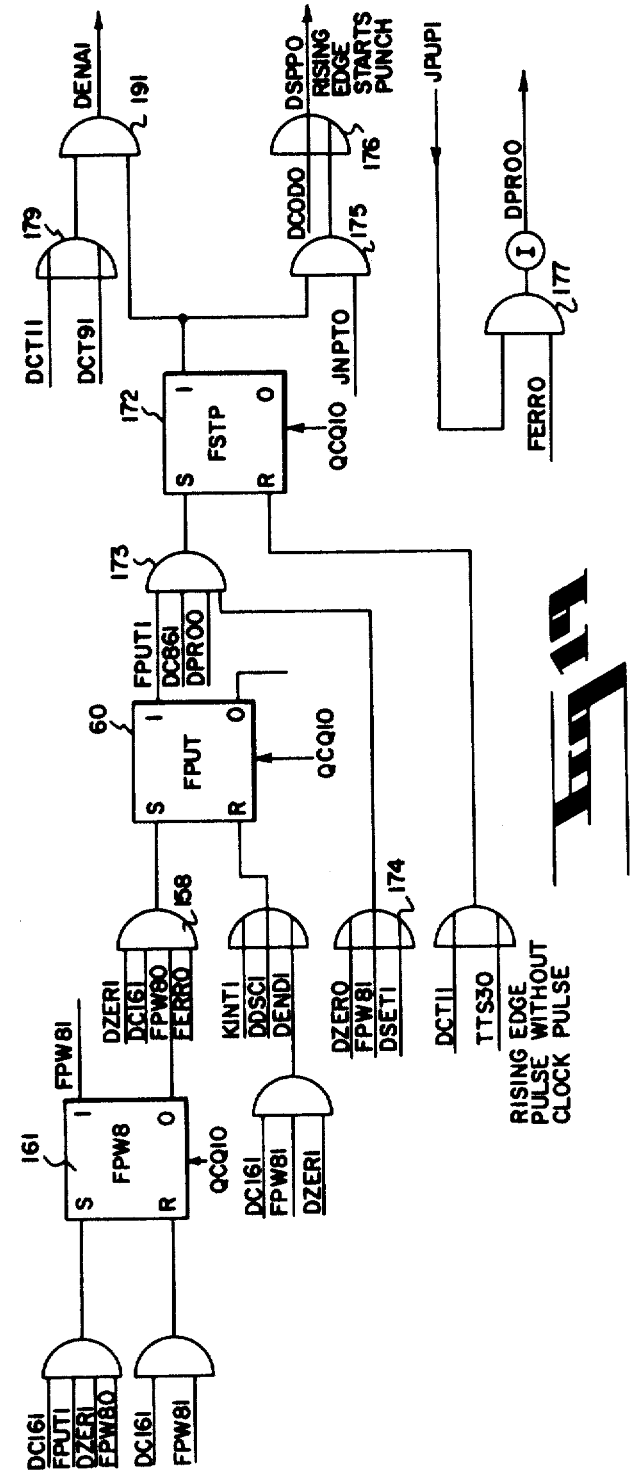

When the called terminal A receives the data transmitted by calling terminal B, the data is punched on paper tape. To accomplish this operation terminal A must be placed in the punch mode. In order to more fully understand the punch mode of operation, reference is made to the flow chart shown in FIG. 18 and to the logic circuits and timing diagrams shown in FIGS. 19 through 22 for details of the punch operation.

Receipt of first zero code

Assume that communication between terminals A and B have been established in the manner heretofore discussed and the called terminal A has its Duplex Mode flip-flop 94 in the reset state. The signal FDPX0 from the 0-output terminal of flip-flop 94 is positive at this time and is applied to AND-gate 190, shown in FIG. 9. If the other input signal JMDA1 from the Receive Data terminal lead 38 of data set **24*a* is positive, conjunction occurs in AND-gate 190 and a positive output signal DMRK0 is generated. If the input signal JMDA1 from the Receive Data terminal lead 38 is negative, conjunction does not occur in AND-gate 190 and the output signal DMRK0 is negative. Since the first signal received on Receive Data terminal lead 38 of data set 24*a* is a start space bit of the zero code, shown in FIG. 10, conjunction occurs in AND-gate 190 and a positive output signal DMRK0 is generated. The clock generator 116 of terminal A is started by the application of the signal DMRK0 to OR-gate 157 of FIG. 9. To prevent voice or noise signals on the line from initiating a punch operation, the punch control logic 30 requires that a zero character be received without error before the punch mode of operation is set. Therefore, if at the count of sixteen all of the flip-flops FSH1 through FSH7 of the shift register 26, shown in FIG. 12, contain zeros a Punch Mode flip-flop 60, shown in FIG. 19, is set. The setting of flip-flop 60** may be expressed in equation form as follows:

$$FPUT1 = DZER1\ DC\ 161\ FPW80\ FERR0$$

wherein the signals DZER1 and DC161 indicate that the zero code is in the shift register 26 and the bit counter 117 has reached the count of 16, respectively. The 8th Column Punch flip-flop 161, shown in FIG. 19, and the Error Punch flip-flop 50, shown in FIG. 20, must initially be in their reset states to cause conjunction of their 0-output terminal signals FPW80 and FERR0 with signals DZER1 and DC161 in AND-gate 158 of FIG. 19. When conjunction occurs in AND-gate 158, an output signal is generated causing the setting of the Punch Mode flip-flop 60 and the initiation of a punching operation. The 8th Column Punch flip-flop 161 can only set at the sixteenth count of bit counter 117 for a zero code other than the first zero code and is reset at the sixteenth count of the next code received. The Error Punch flip-flop 50 is only set if an error is detected, as explained in subsequent paragraphs.

Receipt of non zero character

Figure 21:
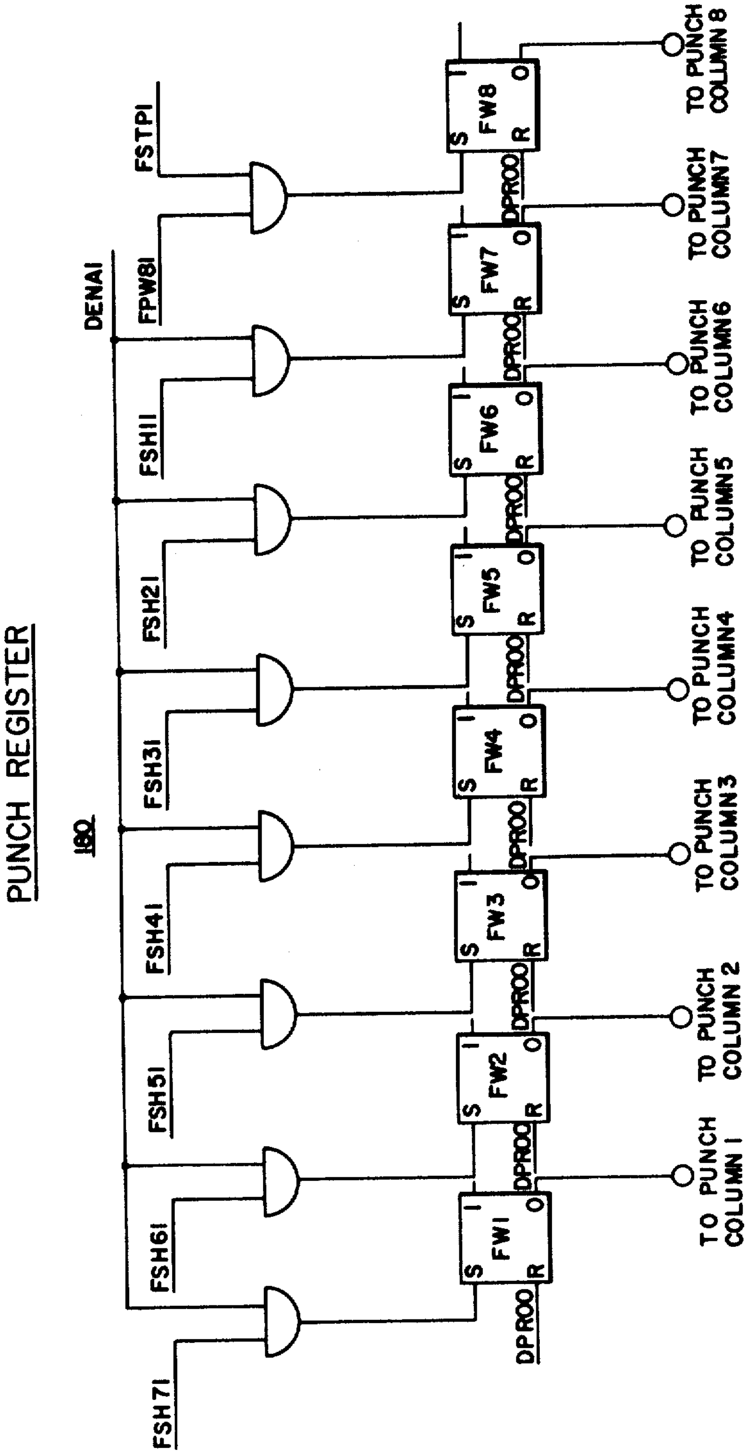
FIG. 21 is a schematic block diagram of the punch register.

After the zero code is received, the punch register shown in FIG. 21 is ready to receive the first data character. No punch action results from the receipt of the initial zero code character.

Since the Duplex Mode flip-flop 94 of terminal A is in its reset state and flip-flop FC03 of counter 117 is also reset, AND-gate 165 of FIG. 12 is enabled and data representing the first non zero character received by terminal A as mark and space signals DMRK1 are shifted into flip-flop FSH1 of register 26 of FIG. 12. OR-gate 166 of FIG. 12 generates a positive output signal when signal DMRK1 received by AND-gate 165 is positive. Since signal DC160 is positive, indicating that the count of sixteen is not in counter 117, the output signal from OR-gate 166 is conjunctively combined with signal DC160 in AND-gate 168 to produce an output signal which is passed through OR-gate 178 to set flip-flop FSH1 of shift register 26. When a space signal is received from the transmission line, signal DMRK1 is negative and conjunction does not occur in AND-gate 165 and positive output signals are not generated by AND-gate 165 and OR-gate 166. Thus, the negative signal DSET0 from OR-gate 166 is inverted by inverter 169 and passed through OR-gate 170 to reset flip-flop FSH1 of shift register 26. Each mark or space signal received is shifted through register 26 in the manner heretofore explained for the description of the Read Tape mode of operation. The above description of the shifting of data through shift register 26 occurs through AND-gate 165 during the first eight counts of counter 117. After the eighth count of counter 117, signal FC030 becomes negative and AND-gate 165 is no longer enabled; however, signal FC031 is now positive and this signal enables AND-gate 171. The data received from the transmission line during the 9th through 16th count of counter 117 is transmitted through AND-gate 171 and OR-gate 166 in the manner just explained.

When the first non zero character has been received and is in the shift register 26 signals are available in the logic circuits at the count of eight of counter 117 to set the Start Punch Control flip-flop 172 shown in FIG. 19.

The Start Punch Control flip-flop 172 is set since the input signals to AND-gate 173, namely FPUT1, DC861, DPR00 and the output signal from OR-gate 174, DZER0, are all positive at this time. The Punch Tape Mode flip-flop 60 was set as previously described. The signal DC861 is generated upon the setting of counter 117 to the count of eight or sixteen and the signals DPR00 and DZER0 indicate that the punch is not in progress and that the zero code is not in the shift register 26. The setting of flip-flop 172 may be expressed in equation form as follows:

$$FSTP1=FPUT1\ DC861\ DPR00\ DZER0$$

As soon as the Start Punch Control flip-flop 172 of FIG. 19 is set, a start punch process signal DSPP0 is generated unless the generation of this signal is inhibited by a punchout of tape signal JNPT0. If the punch is out of tape, the signal JNPT0 will be negative and conjunction of the signals FSTP1 and JNPT0 will not occur in AND-gate 175, thus inhibiting the generation of signal DSPP0 by OR-gate 176. The leading edge of signal DSPP0 is detected by the punch structure as the start punch signal instigates a punching action by setting a Feed Control flip-flop (not shown) of the punch structure. The Feed Control flip-flop returns a Punch in Process signal JPUP1, shown in FIG. 19. The signal JPUP1 is conjunctively combined in AND-gate 177 with the Error Control Output signal FERR0 of flip-flop 50, shown in FIG. 20 to provide an output signal DPR01 signifying that the punch is in process and an error has not been detected.

Simultaneously with the generation of the signal DSP00 by OR-gate 176, the 1-output terminal signal FSTP1 from the Start Punch Control flip-flop 172 is conjunctively combined in AND-gate 191 with the output signal of OR-gate 179 to generate the register shift signal DENA1. The input signals to OR-gate 179 are signals DCT11 and DCT91 representing counts 1 and 9 in counter 117. The Start Punch Control flip-flop 172 through the generation of signal DENA1 enables the transfer of data from the shift register 26 to an 8 bit punch register 180, shown in FIGS. 2 and 21. The generation of the shift signal DENA1 may be expressed in equation form as follows:

$$DENA1=FSTP1\ (DCT11+DCT91)$$

The punch register 180 comprises a plurality of flip-flops FW1 through FW8, one flip-flop for each of the data bits received from the shift register 26 and one bit for storage of a bit indicating the receipt of an eighth column signal as heretofore explained. The data bits are shifted from the shift register 26 to the punch register 180 when data bits are stored in the shift register and the triggering signal DENA1 is generated. The character comprising the bits transferred to flip-flops FW1 through FW7 remains in the punch register and supplies input signals to the punch information lines while the punch is in operation. When the punch is not in process, signal DPR00, shown in FIG. 19, is positive and resets the flip-flops of the punch register 180. It should be noted that if the punch is in process at the count of eight of the clock generator 116, the signal DPR00 resulting therefrom is negative and this signal applied to an input terminal of AND-gate 173 prevents conjunction from occurring and consequently prevents setting of Start Punch Control flip-flop 172. Thus, the punch remains in process up until the count of sixteen. At this time, the input signal DC861 to AND-gate 173 again goes positive. If the punch is not in process at this time, signal DPR00 will be positive and conjunction will occur in AND-gate 173 if all other input signals to AND-gate 173 are positive at this time.

This logic arrangement provides a buffering service in the punch register equal to sixteen counts of the clock generator, i.e., one clock generating cycle. In addition the shift register provides buffering service of one-half of a cycle; namely, eight clock pulses. In order to maintain maximum punch speed buffering of up to one cycle is needed while waiting for access to the correct time to start the punch structure and one-half cycle is required to punch the character. Note that on successive characters the punch set in process signal DPR00 becomes positive either prior to the eighth or sixteenth clock pulse of a clock generating cycle. Thus, the punch register has two opportunities to receive the character, i.e., at the end of the eighth clock pulse or at the end of the sixteenth clock pulse, as explained heretofore. It should be noted that this feature is possible since the character transmitted is followed by an inverse rendition thereof and when the inverse rendition is shifted through shift register 26 of FIG. 12, it is translated into the image of the character received.

Error circuitry

Figure 20:
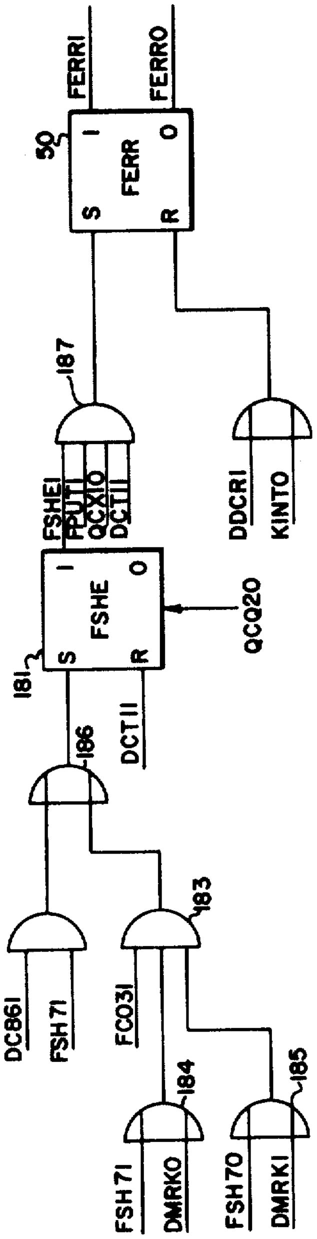
FIG. 20 is a simplified block diagram of the error punch logic.

During the punching operation, the Error flip-flop 50, shown in FIG. 20, will be set if a shift error occurred during receipt of the double character, i.e., the character plus the inverse rendition thereof. The setting of Error flip-flop 50 will cause sprocket only punches to be punched for all remaining characters in the block that contained the error.

Two different error tests are made in the shift error logic, shown in FIG. 20. The condition of flip-flop FSH7 of the shift register 26 is checked at the count of eight of the bit counter 117 in FIG. 10. At this time, the start bit of each character should be stored in flip-flop FSH7 of shift register 26 and the flip-flop should be in its reset state, i.e., its "0" state. If flip-flop FSH7 is in its "1" state, Shift Input Error flip-flop 181, shown in FIG. 20, will be set. Since flip-flop 181 is gated with clock synchronizing signals QCQ20, the ninth clock signal actually enables the setting of Shift Input Error flip-flop 181. The timing signal DC861 is decoded from the bit counter and is positive when the counter reaches the count of 8.

The setting of the Shift Input Error flip-flop 181 may be expressed in equation form as follows:

$$FSHE1=DC861\ FSH71+(FSH71+DMRK0)\cdot(FSH70+DMRK1)\ FC031$$

The second error test consists of comparing the second (inverse) transmission of the character with the first. The comparison is made between each of the bits of the character being transferred out of the shift register 26 from its flip-flop FSH7 and the comparable bit of the same character inverted which is to be transferred into flip-flop FSH1 of the shift register.

After the counter 117 is at the count of 8, the signal FC031 is generated by flip-flop FC03 and applied to AND-gate 183 shown in FIG. 20. If flip-flop FSH7 of shift register 26 is set indicating that a mark bit is stored therein, then the inverse of this mark bit, namely a space bit, must be received by the data set and ready for transmittal into flip-flop FSH1 of the shift register. Thus, if a mark condition exists in flip-flop FSH7 of shift register 26, then signals FSH71 at OR-gate 184, shown in FIG. 20, will be positive and a resulting output signal from OR-gate 184 will be transmitted to the second input terminal of AND-gate 183. Since a space bit (inverse of the mark stored in flip-flop FSH7 of register 26) is ready for shifting into flip-flop FSH1 of register 26, OR-gate 185 is not enabled, i.e., signal DMRK1 is negative. An output signal is not generated by OR-gate 185 and the third input terminal to AND-gate 184 remains negative. Thus, an output signal is not generated by AND-gate 184 and Shift Input Error flip-flop 181 is not set indicating that the character bit checked is correct.

If the inverse bit received by the data set was a mark bit, then OR-gate 185 would produce an output signal which would enable AND-gate 183, thereby generating an output signal which would be applied to OR-gate 186. The output signal from OR-gate 186 would then set the Shift Input Error flip-flop 181.

Since AND-gate 187 is enabled by signals FPUT1, QCX10 and DCT11 at this time, indicating that terminal A is in the punch tape mode, the clock generator has stopped and count 1 is in the counter. Error flip-flop 50 is set. The setting of Error flip-flop 50 shown in FIG. 20 may be expressed in equation form as follows:

$$FERR1=FSHE1\ FPUT1\ DCT11\ QCX10$$

When Error flip-flop 50 is in the set condition, the signal DPR00 holds or transfers the punch register to its reset state, thus altering the data character transferred to the punch information lines. This results in sprocket holes only being punched in the tape for the remainder of the block of data.

Each data bit of each character is checked for an error condition in the manner above-described. Whenever an error is found, the remaining portion of the block of data is provided with sprocket holes, as above-stated.

Figure 22:
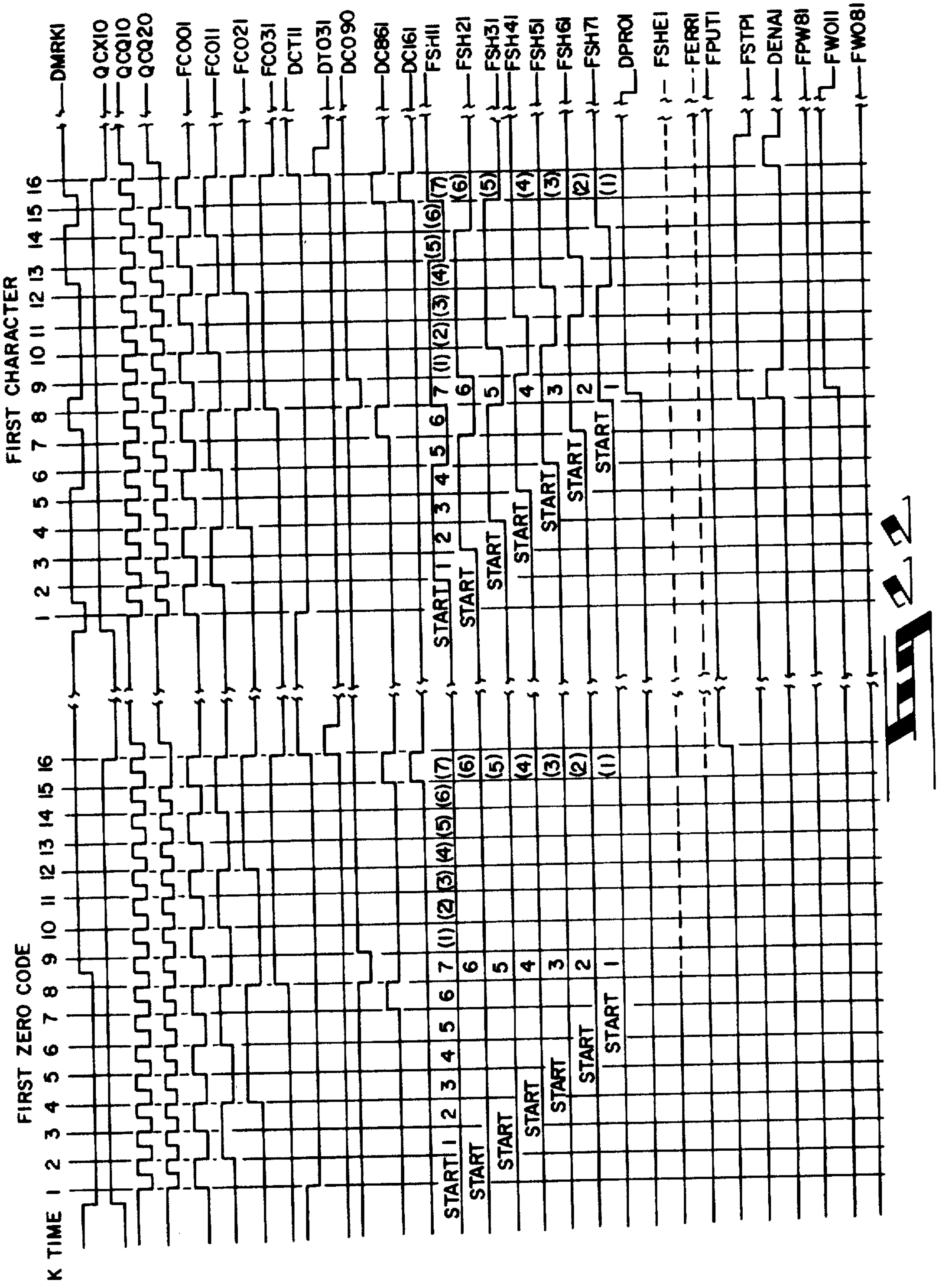
FIG. 22 is a diagrammatic illustration in chart form of the timing and logic signals involved in a punch operation.

FIGURE 22 illustrates a timing chart of the punch operation wherein each of the identified signals is illustrated with regard to various counts of counter 117. The various positions of the start bit and the following seven bits of the first zero code and the first data character are shown by waveforms FSH11 through FSH71. The waveform identified by signal DMRK1 illustrates the mark or space condition of the bit received by the data set at terminal A.

As noted from waveforms representing signals FSH11 through FSH71 of FIG. 22, the bits of the inverse character received from the transmission line are shifted through register 26 (other than the start bit) in the same image as the bits of the original character entered into the shift register. The reason for this condition may be obvious from the logic shown in FIG. 12, and particularly AND-gates 165 and 171 furnishing input signals to OR-gate 166. As noted from FIG. 12, mark or space signals set or reset flip-flop FSH1 of the shift register 26 through the application of signals to AND-gate 165 and OR-gate 166 during the first eight counts of counter 117. During the second eight counts of counter 117, AND-gate 171 and OR-gate 166 set or reset flip-flop FSH1 of the shift register.

End-of-Block column 8 punch

Figure 23:
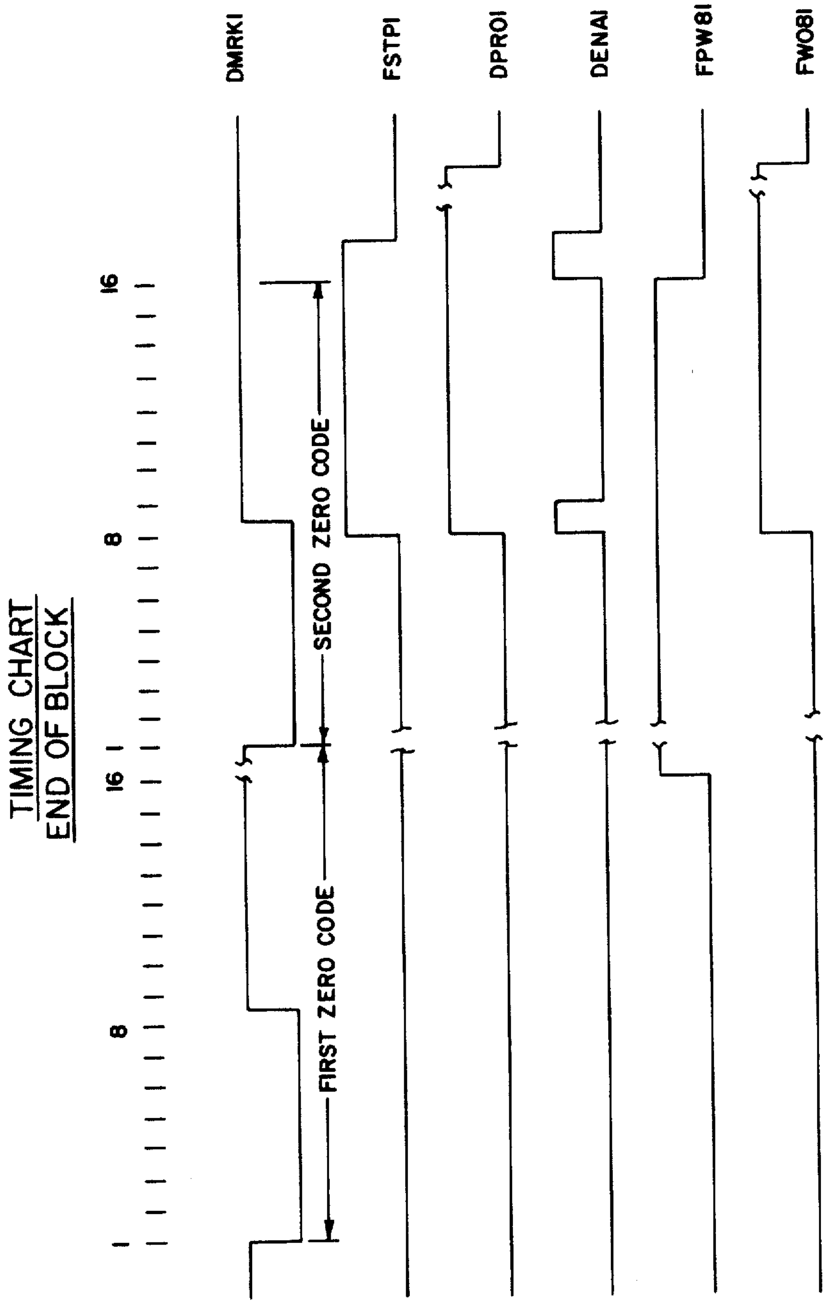
FIG. 23 is a diagrammatic illustration in chart form of the timing signals provided by the punch control logic for the End-of-Data Block recognition.

The data receive and punch cycle is repeated for each duplicate set of characters received until the End-of-Block signal. This signal consists of two consecutive zero codes and results in a punch in column 8 of the paper tape. FIGURE 23 illustrates a timing chart of the signals involved.

When the first zero code of an End-of-Block signal is received, the signal DZER1 indicating the receipt by the shift register 26 of the zero code prevents the setting of Start Punch Control flip-flop 172 at either the count of eight or sixteen. This occurs by retaining Punch Mode Tape flip-flop 60 reset. Since the input signals DZER0, FPW81 and DSET1 to AND-gate 174 shown in FIG. 19 are all negative at this time no output signal from AND-gate 173 will be generated to set Start Punch Control flip-flop 172. Signal DZER0 is negative at this time since a zero code is in the shift register 26. The punch-column 8 flip-flop 161 is reset and the signal DSET1 is negative since the last bit of the zero code character is set in flip-flop FSH1 of the shift register. Thus, flip-flop 172 is not set. The timing chart shown in FIG. 23 illustrates this condition.

At the count of sixteen of counter 117 the Punch Column flip-flop 161 will be enabled and at the next clock pulse will be set. The enabling of flip-flop 161 may be expressed by the following equation:

$$FPW81 = DC161\ FPUT1\ DZER1\ FPW80$$

With the Punch Column flip-flop 161 set, an output signal will be generated by OR-gate 174 and since the other input signals to AND-gate 173 will be positive at this time, namely input signals FPUT1 and DPR00 the Start Punch Control flip-flop 172 will be set at the count of eight of the second code when signal DC861, indicating that the counter has reached the count of eight, goes positive. The setting of Start Punch Control flip-flop 172 initiates a punching action and since Punch Column flip-flop 161 is set, only column 8 punch results from the receipt of the two successive zero codes. The signal waveform FW081 of FIG. 23 illustrates the time at which FW08 flip-flop in FIG. 21 will be set thereby enabling the punching of the 8th column by the punch structure.

At the count of sixteen of counter 117 the Punch Tape Mode flip-flop 60 is reset. The resetting of flip-flop 60 may be expressed by the following equation:

$$FPUT0 = DZER1\ FPW81\ DC161$$

As soon as the carrier wave from the transmitting terminal B ceases after the completion of the transmission of the block of data, the Request to Send flip-flop 87 of the Communication Control logic of terminal A will be set if the transmission was correct. The setting of flip-flop 87 may be defined by the following equation:

$$FRSD1 = FPUT0\ JNPT0\ FERR0\ DPR00\ FDPX0\ DOND0$$

A return carrier wave signal is generated by the data set 24*a* for transmittal to terminal B as an acknowledgment of the receipt of the data, when the Request to Send flip-flop 87 is set and delivers a positive control signal to terminal load 34.

If there is an error condition, the Request to Send flip-flop 87 is not set since AND-gate 95 is not enabled by the negative FERR0 signal applied to AND-gate 95. One quarter of a second delay after the carrier wave from terminal B has ceased a blank tape or space marker signal DCOD0 is generated at terminal 108 of FIG. 8 causing a blank tape code signal to be punched in the paper tape. After a two second delay, as explained heretofore, the carrier wave will be restored by the sending terminal B and after an exchange of carrier signals between the two terminals the error block of data will be retransmitted.

While the principles of the invention have now been made clear in an illustrative embodiment, there will be immediately obvious to those skilled in the art many modification of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A system for generating clock pulses comprising a first means for serially providing a group of signals wherein said signals represent binary digits having a fixed repetition rate, a second means coupled to said first means and responsive to said group of signals for generating oscillations at substantially the same frequency as said repetition rate of said binary digits and in phase with said group of signals, a counter circuit operated in response to oscillation generated by said generating means for advancing through a counting cycle, and a third means coupled to said counter and said first means and jointly responsive to a given count of said counter and a given signal of said group of signals for stopping said second means.

2. A system for generating clock pulses comprising a first means for serially receiving a group of signals wherein said signals represent binary digits having a fixed repetition rate, a second means coupled to said first means and responsive to the receipt by said first means of said group of signals for generating oscillations at substantially the same frequency as said repetition rate of said binary digits and in phase with said group of signals, a counter circuit operated in response to oscillation generated by said generating means for advancing through a counting cycle, and a third means coupled to said counter and said first means and jointly responsive to a given count of said counter and the receipt by said first means of a given signal of said group of signals for stopping said second means.

3. A system for generating clock pulses comprising a first means for receiving a group of signals wherein said signals represent binary digits having a fixed repetition rate, a second means coupled to said first means and responsive to the receipt by said first means of the first signal of said group of signals for generating oscillations at substantially the same frequency as said repetition rate of said binary digits and in phase with the first signal of said group of signals, a counter circuit operated in response to oscillation generated by said generating means for advancing through a counting cycle, and a third means coupled to said counter and said first means and jointly responsive to a given count of said counter and the receipt by said first means of a given signal of said group of signals for stopping said second means.

4. A system for generating clock pulses comprising a first means for receiving a group of signals wherein said signals represent binary digits having a fixed repetition rate, a second means coupled to said first means and responsive to the receipt by said first means of the first signal of said group of signals for generating oscillations at substantially the same frequency as said repetition rate of said binary digits and in phase with the first signal of said group of signals, a counter circuit operated in response to oscillation generated by said generating means for advancing through a counting cycle equal to the number of binary digits in said group of signals, and a third means coupled to said counter and said first means and jointly responsive to a count of said counter equal to said number and the receipt by said first means of a given signal of said group of signals for stopping said second means.

5. A system for asynchronously generating groups of clock pulses comprising a first means for receiving groups of signals wherein said signals represent binary digits having a given repetition rate, a second means coupled to said first means and responsive to the receipt by said first means of the first signal of each group of signals for generating oscillations at substantially the same frequency as said repetition rate of said binary digits and in phase with the first signal of each of said groups of signals, a counter circuit operated in response to oscillation generated by said generating means for advancing through a counting cycle, and a third means coupled to said counter and said first means and jointly responsive to a given count of said counter and the receipt by said first means of a given signal of each of said groups of signals for stopping said second means.

6. A system for generating clock pulses comprising a storage means, receiving means for receiving a group of signals wherein said signals represent binary digits having a fixed repetition rate and for serially applying signals representing received binary digits of said group of signals to an input of said storage means, means coupled to said receiving means and responsive to the receipt by said receiving means of the first signal of said group of signals for generating clock oscillations at substantially the same frequency as said repetition rate and in phase with the first signal of said group of signals, means for applying said clock oscillations to said storage means for timing binary digit entry into said storage means, a counter circuit operated in response to oscillation generated by said generating means for advancing through a counting cycle, and gating means coupled to said counter and said receiving means and jointly responsive to a given count of said counter and the receipt by said receiving means of a given signal of said group of signals for stopping said generating means.

7. A system for generating clock pulses comprising a multi-stage shift register means, means for receiving groups of signals wherein said signals represent binary digits having a fixed repetition rate and for serially applying signals representing received binary digits of said groups of signals to a stage of said shift register means, timing means coupled to said receiving means and responsive to the receipt by said receiving means of each group of signals for generating timing pulses at substantially the same frequency as said repetition rate of said binary digits and in phase with each group of signals, means responsive to said timing pulses for applying shift pulses to said shift register means, a counter circuit operated in response to timing pulses generated by said timing means for advancing through a counting cycle, and gating means coupled to said counter and said shift register means and jointly responsive to a given count of said counter and the receipt by said shift register means of a given signal of each of said groups of signals for stopping said timing means.

8. A system for generating clock pulses comprising a multi-stage shift register means, means for receiving groups of signals wherein said signals represent binary digits having a fixed repetition rate and for serially applying signals representing received binary digits of said groups of signals to an initial stage of said shift register means, timing means coupled to said receiving means and responsive to the receipt by said receiving means of the first signal of each group of signals for generating timing pulses at substantially the same frequency as said repetition rate of said binary digits and in phase with the first signal of each group of signals, means responsive to said timing pulses for applying shift pulses to said shift register means, a counter circuit operated in response to timing pulses generated by said timing means for advancing through a counting cycle, and gating means coupled to said counter and said shift register means and jointly responsive to a given count of said counter and the receipt by said shift register means of a given signal of each of said groups of signals for stopping said timing means.

9. A start-stop system for generating groups of clock pulses comprising a storage means, means for receiving groups of signals wherein said signals represent binary digits having a fixed repetition rate and for serially applying signals representing received binary digits of said groups of signals to an input of said storage means, timing means coupled to said receiving means and responsive to the receipt by said receiving means of the first signal of each group of signals for generating timing pulses at substantially the same frequency as said repetition rate of said binary digits and in phase with the first signal of each group of signals, a counter circuit operated in response to timing pulses generated by said timing means for advancing through a counting cycle for each group of signals equal to the number of signals in each group of signals, and gating means coupled to said counter and said receiving means and jointly responsive to a given count of said counter and the receipt by said receiving means of a given signal of each group of signals for stopping said generating means, said generating means operating asynchronously upon receipt of each group of signals.

10. A start-stop system for generating groups of clock pulses comprising a storage means, means for receiving groups of signals wherein said signals represent binary digits having a fixed repetition rate and for serially applying signals representing received binary digits of said groups of signals to said storage means, timing means coupled to said receiving means and responsive to the receipt by said receiving means of a given signal of each group of signals for generating timing pulses at substantially the same frequency as said repetition rate of said binary digits and in phase with the first signal of each group of signals, means responsive to said timing pulses for applying shift pulses to said storage means, a counter circuit operated in response to timing pulses generated by said timing means for advancing through a counting cycle, and gating means coupled to said counter and said storage means and jointly responsive to a given count of said counter and the receipt by said storage means of a given signal of each of said groups of signals for stopping said timing means, said generating means operating asynchronously upon receipt of each group of signals.

(References on following page)

References Cited

UNITED STATES PATENTS

| | | | |
|---|---|---|---|
| 3,334,181 | 8/1967 | Bartlett et al. | 178—50 |
| 3,332,068 | 7/1967 | McLaughlin et al. | 340—172.5 |
| 3,266,024 | 8/1966 | Kersey et al. | 340—172.5 |
| 3,262,102 | 7/1966 | Gabor | 340—172.5 |
| 3,197,739 | 7/1965 | Newman | 340—172.5 |
| 3,104,375 | 9/1963 | Wright | 340—172.5 |
| 3,102,997 | 9/1963 | Dirks | 340—172.5 |
| 2,873,366 | 2/1959 | Knight | 250—27 |
| 3,248,664 | 4/1966 | Krasnick et al. | 331—2 |
| 3,156,767 | 11/1964 | Van Duuren et al. | 178—58 |

GARETH D. SHAW, *Primary Examiner.*

U.S. Cl. X.R.

178—58, 69.5